United States Patent
Choi et al.

(10) Patent No.: US 12,303,864 B2
(45) Date of Patent: May 20, 2025

(54) HYDROCARBON ADSORPTION AND DESORPTION COMPLEX COMPRISING ZEOLITE WITH CONTROLLED CATION AND PREPARATION METHOD THEREFOR

(71) Applicant: Korea University Research and Business Foundation, Seoul (KR)

(72) Inventors: Jungkyu Choi, Seoul (KR); Kwan-Young Lee, Seoul (KR); Jinseong Kim, Seoul (KR); Eunhee Jang, Anyang-si (KR)

(73) Assignee: Korea University Research and Business Foundation, Seoul (KR)

( * ) Notice: Subject to any disclaimer, the term of this patent is extended or adjusted under 35 U.S.C. 154(b) by 60 days.

(21) Appl. No.: 17/533,712

(22) Filed: Nov. 23, 2021

(65) Prior Publication Data
US 2022/0161227 A1    May 26, 2022

(30) Foreign Application Priority Data
Nov. 24, 2020   (KR) .................. 10-2020-0158372

(51) Int. Cl.
| | |
|---|---|
| *B01J 20/18* | (2006.01) |
| *B01J 20/28* | (2006.01) |
| *B01J 20/30* | (2006.01) |
| *B01J 23/72* | (2006.01) |

(52) U.S. Cl.
CPC ......... *B01J 20/18* (2013.01); *B01J 20/28004* (2013.01); *B01J 20/3078* (2013.01); *B01J 23/72* (2013.01)

(58) Field of Classification Search
CPC .. B01J 20/18; B01J 20/28004; B01J 20/3078; B01J 20/186; B01J 20/3085; B01J 20/3204; B01J 20/3236; B01J 20/28016; B01J 20/3466; B01J 20/183; B01J 20/06; B01J 23/72; B01D 53/02;
(Continued)

(56) References Cited

U.S. PATENT DOCUMENTS

| | | | |
|---|---|---|---|
| 10,099,979 B2 * | 10/2018 | Román-Leshkov | .... C07C 29/50 |
| 2020/0324268 A1 | 10/2020 | Kang et al. | |

FOREIGN PATENT DOCUMENTS

| | | |
|---|---|---|
| JP | 2966304 B2 | 10/1999 |
| JP | 2000-61239 A | 2/2000 |
| JP | 2012-512022 A | 5/2012 |

(Continued)

OTHER PUBLICATIONS

Kim et al. Catalysis Today 314, 2018, 78-93 (Year: 2018).*
(Continued)

*Primary Examiner* — Coris Fung
*Assistant Examiner* — Jordan W Taylor
(74) *Attorney, Agent, or Firm* — NSIP Law

(57) ABSTRACT

Disclosed are a hydrocarbon adsorption and desorption complex including zeolite with a controlled cation type and a preparation method therefor. The hydrocarbon adsorption and desorption complex exhibits excellent hydrocarbon adsorption and oxidation performance even at a temperature lower than a catalyst activation temperature by controlling the distribution of metal ions and metal oxides, and also exhibits excellent hydrocarbon adsorption and oxidation performance even in the presence of water, by being prepared through hydrothermal treatment.

11 Claims, 20 Drawing Sheets

(58) Field of Classification Search
CPC ........ B01D 2253/108; B01D 2257/702; B01D 2258/01; B01D 53/04
See application file for complete search history.

(56) References Cited

FOREIGN PATENT DOCUMENTS

| KR | 10-2019-0081424 A | 7/2019 |
|---|---|---|
| KR | 10-2085652 B1 | 3/2020 |
| WO | WO-2019002045 A1 * | 1/2019 |
| WO | WO 2019/132482 A1 | 7/2019 |

OTHER PUBLICATIONS

Navlani-Garcia et al. Environ. Sci. Technol. 2013, 47, 11, 5851-5857 Supporting Information (Year: 2013).*
Navlani-Garcia et al. Environ. Sci. Technol. 2013, 47, 11, 5851-5857 (Year: 2013).*
Belarbi et al. Eur. Phys. J. Special Topics 224, 1963-1976 (2015) (Year: 2015).*
Hammond et al. Advances in Catalysis, 2013, vol. 56 (Year: 2013).*
Yang et al. Materials 2020, 13, 888 (Year: 2013).*
Joyner, Richard, and Michael Stockenhuber. "Preparation, characterization, and performance of Fe-ZSM-5 catalysts." *The Journal of Physical Chemistry B* 103.29 (Jul. 2, 1999): pp. 5963-5976.
Korean Office Action issued on May 13, 2022 in counterpart Korean Patent Application No. 10-2020-0158372 (8 pages in Korean).
Japanese Office Action issued on Sep. 15, 2022, in counterpart Japanese Patent Application No. 2021-189494 (5 pages in Japanese).

* cited by examiner

[FIG. 1]
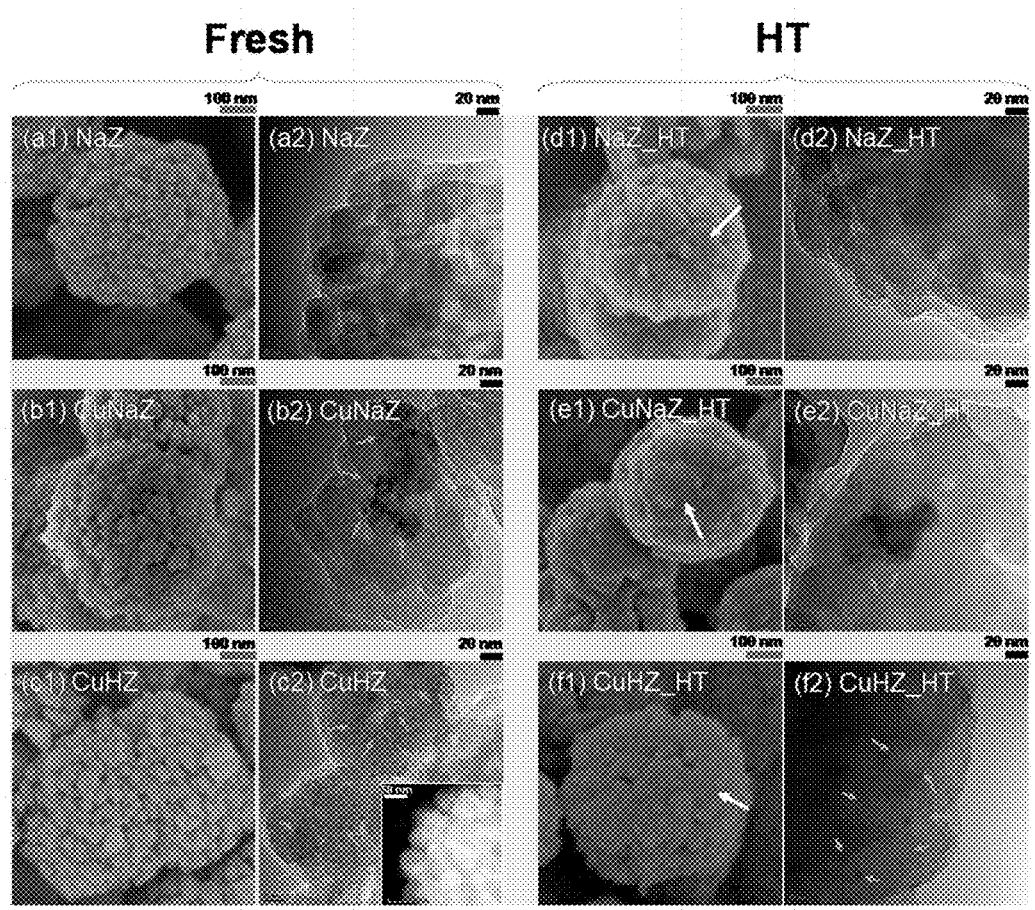

[FIG. 2]
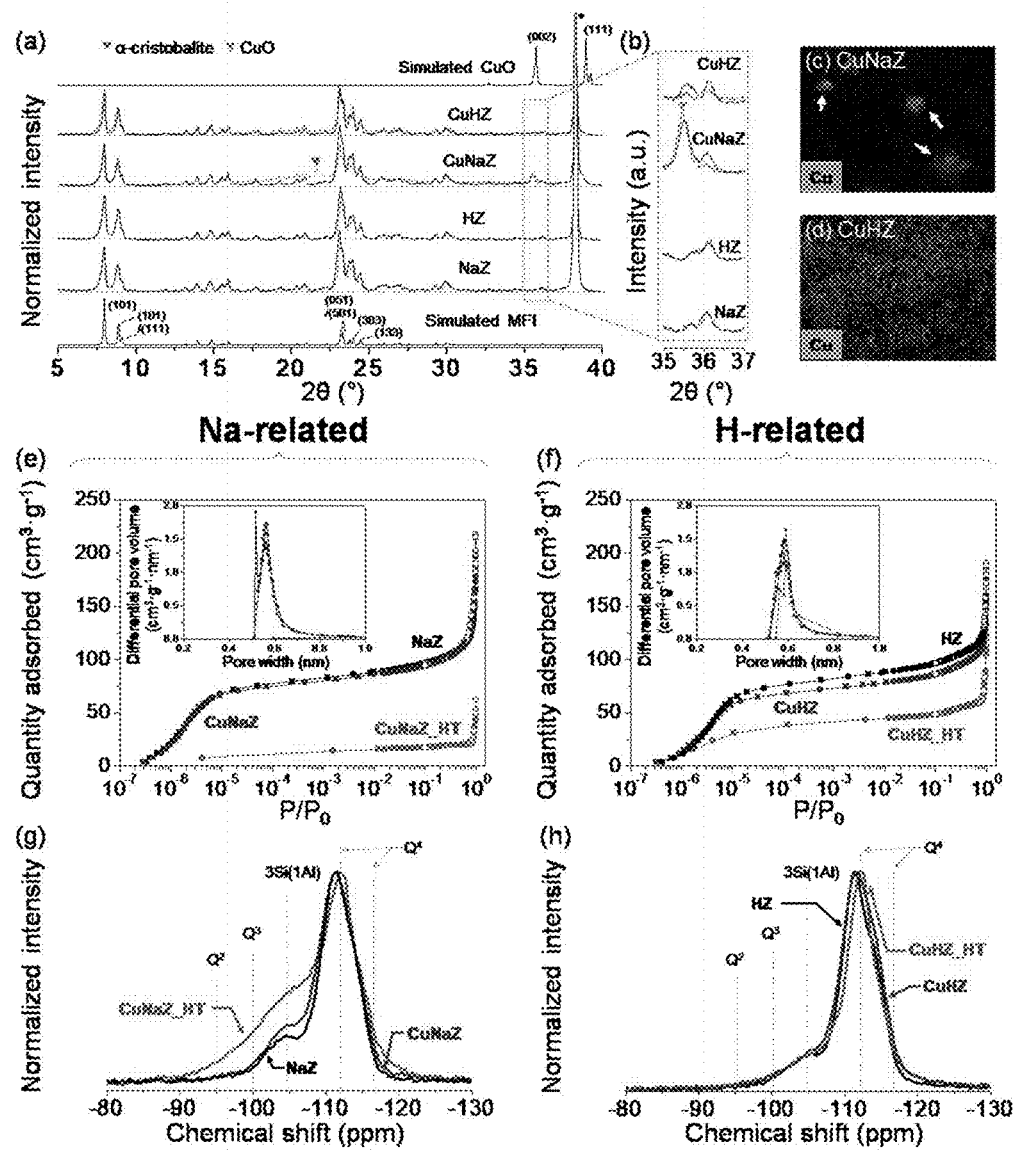

[FIG. 3]
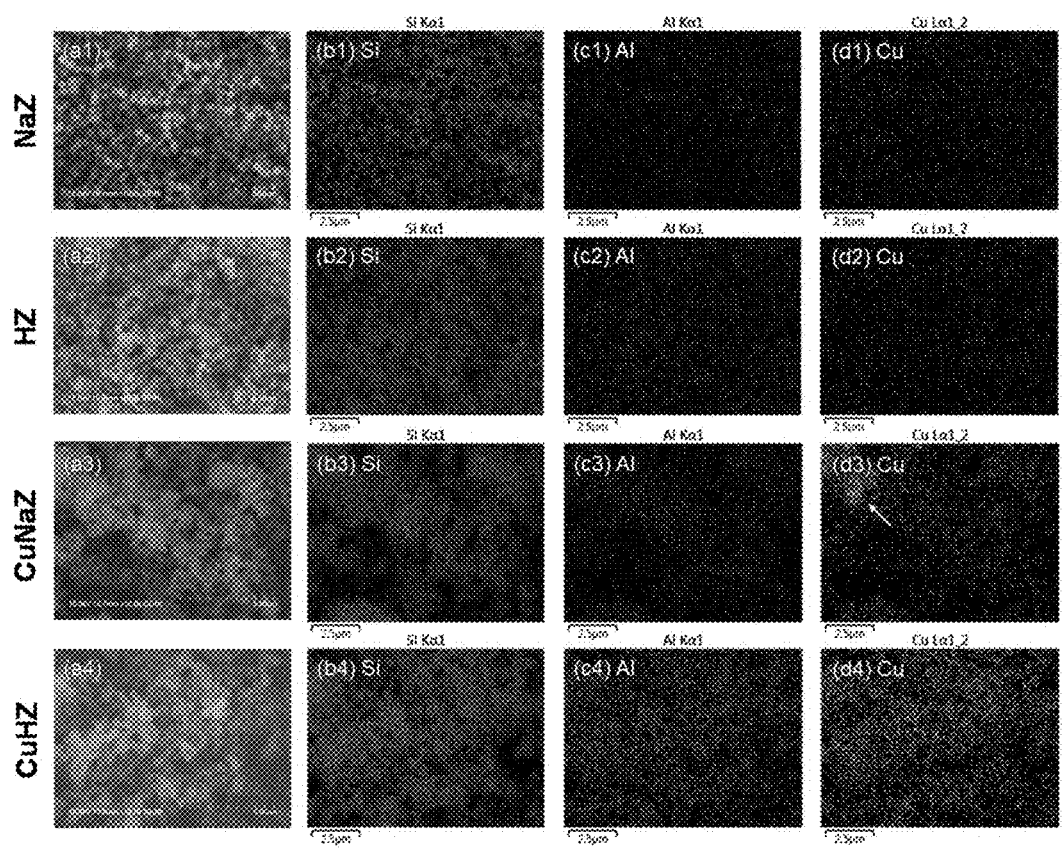

[FIG. 4]
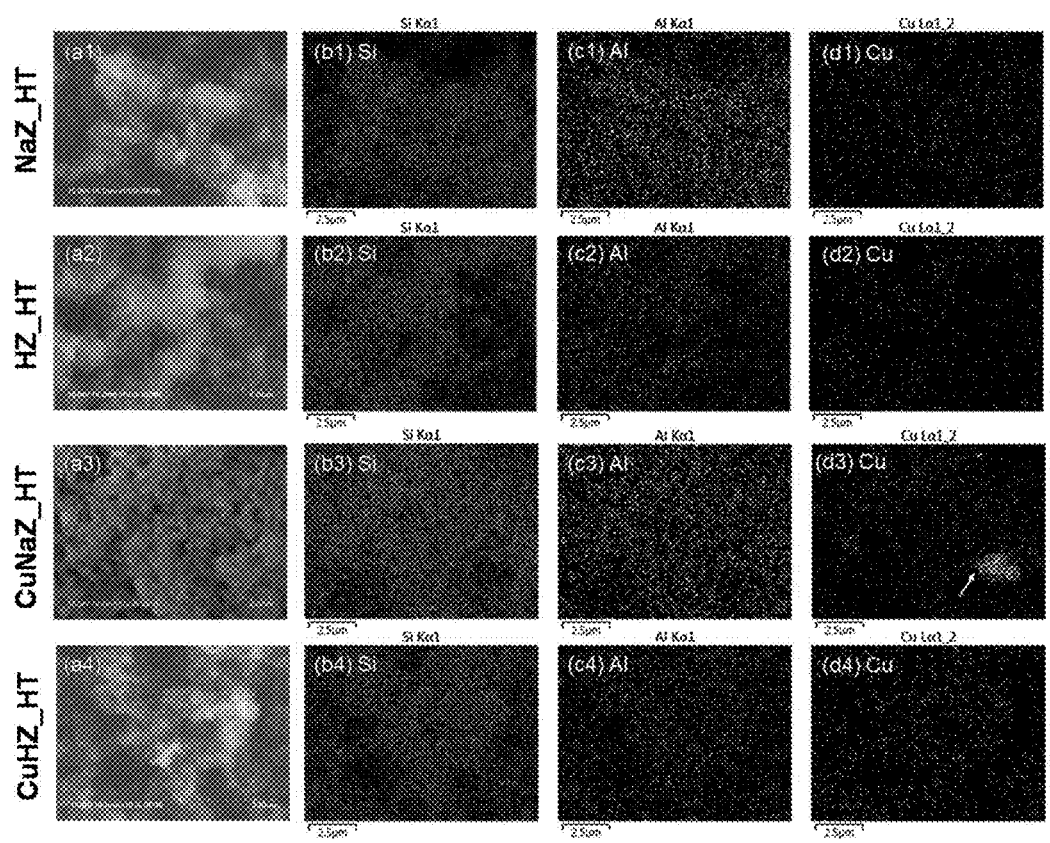

[FIG. 5]
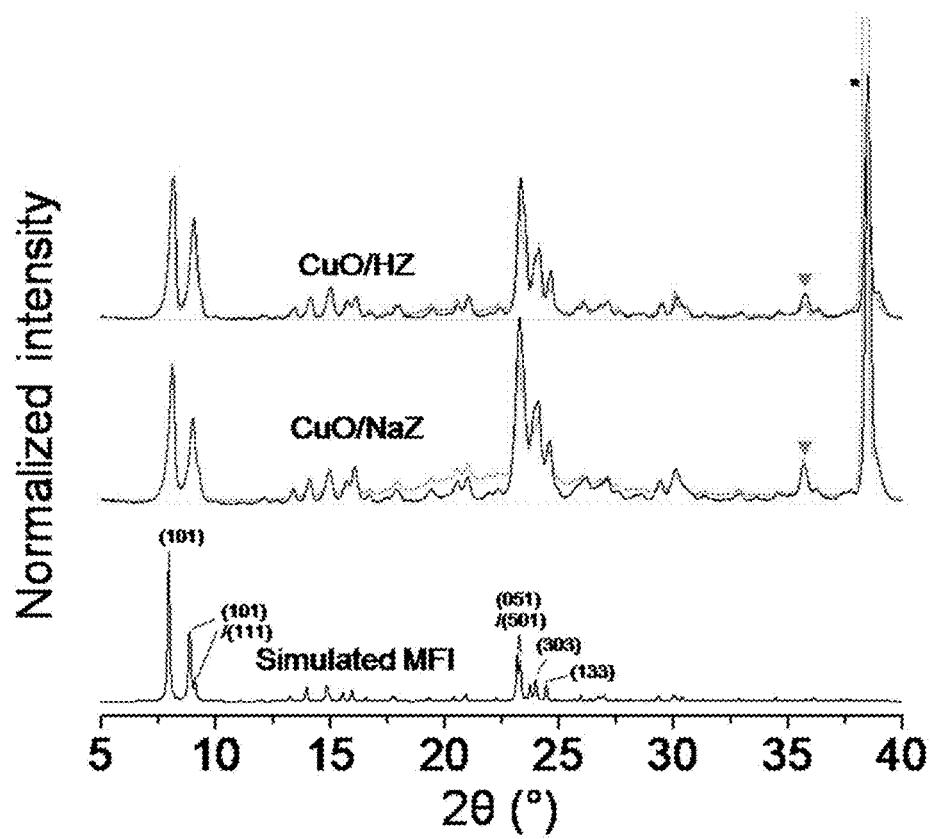

[FIG. 6]
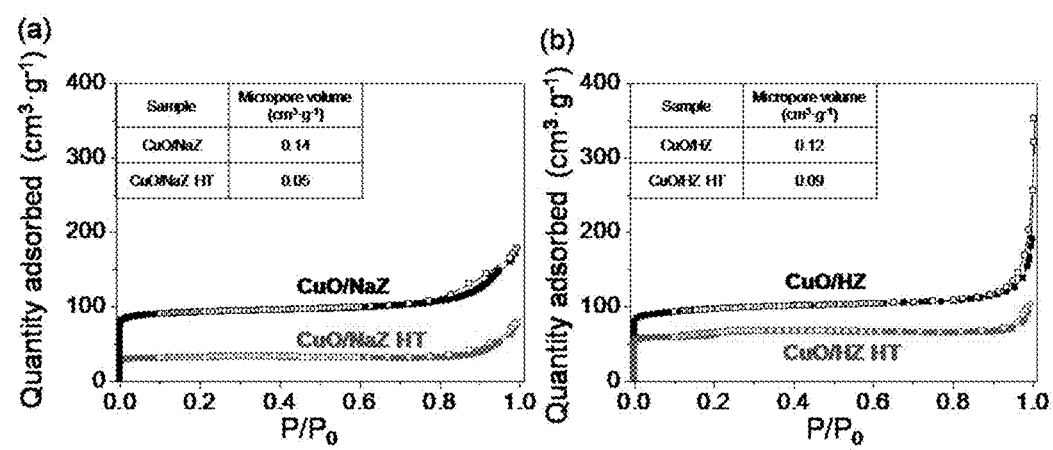

[FIG.7]
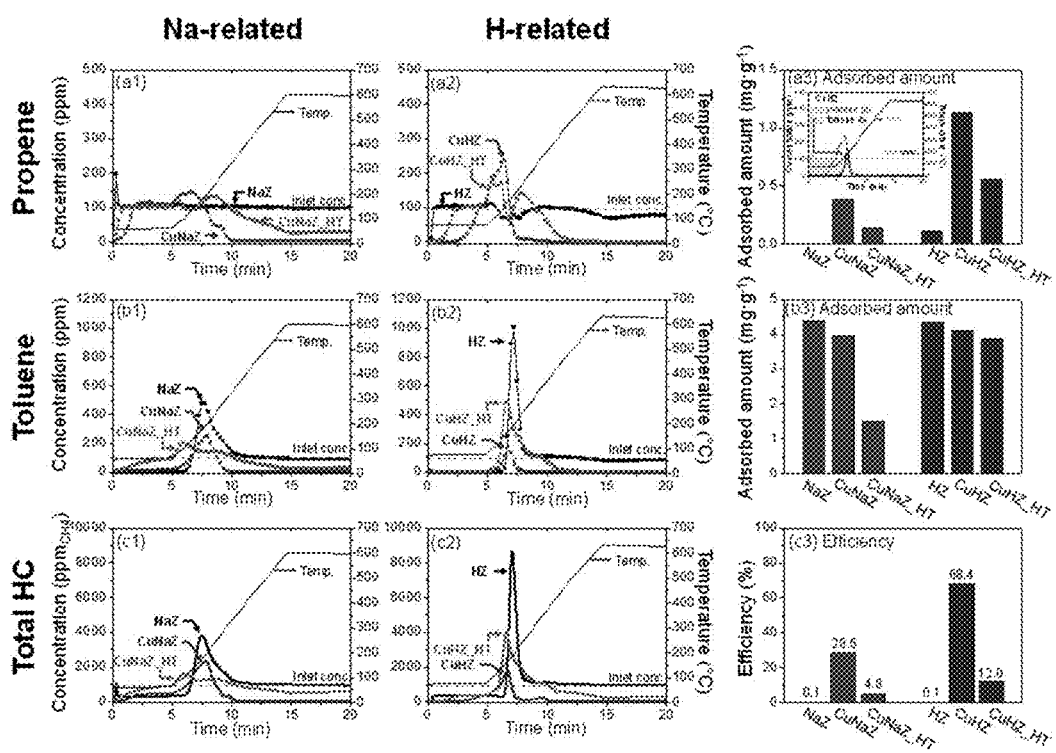

[FIG. 8]
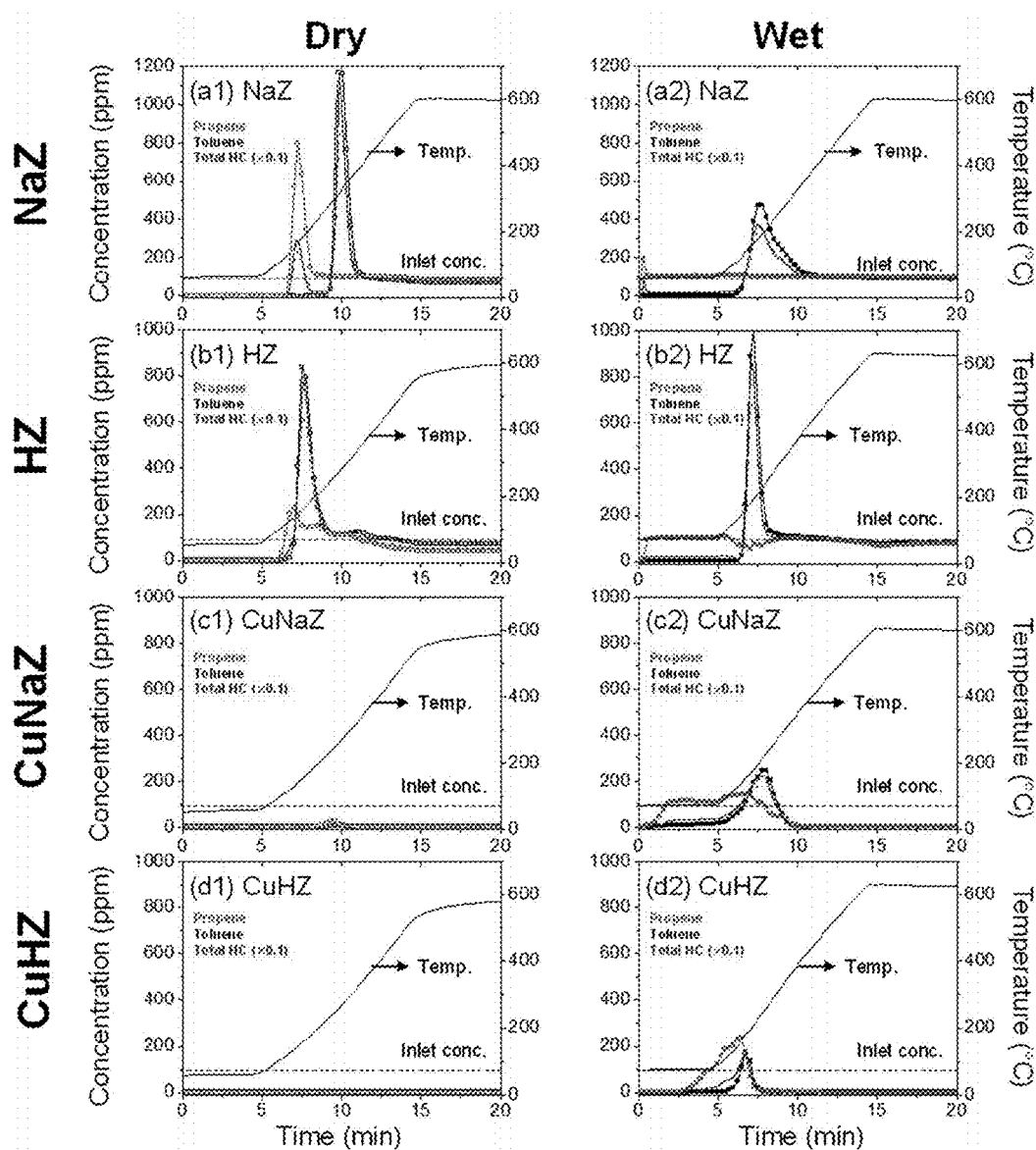

[FIG. 9A]
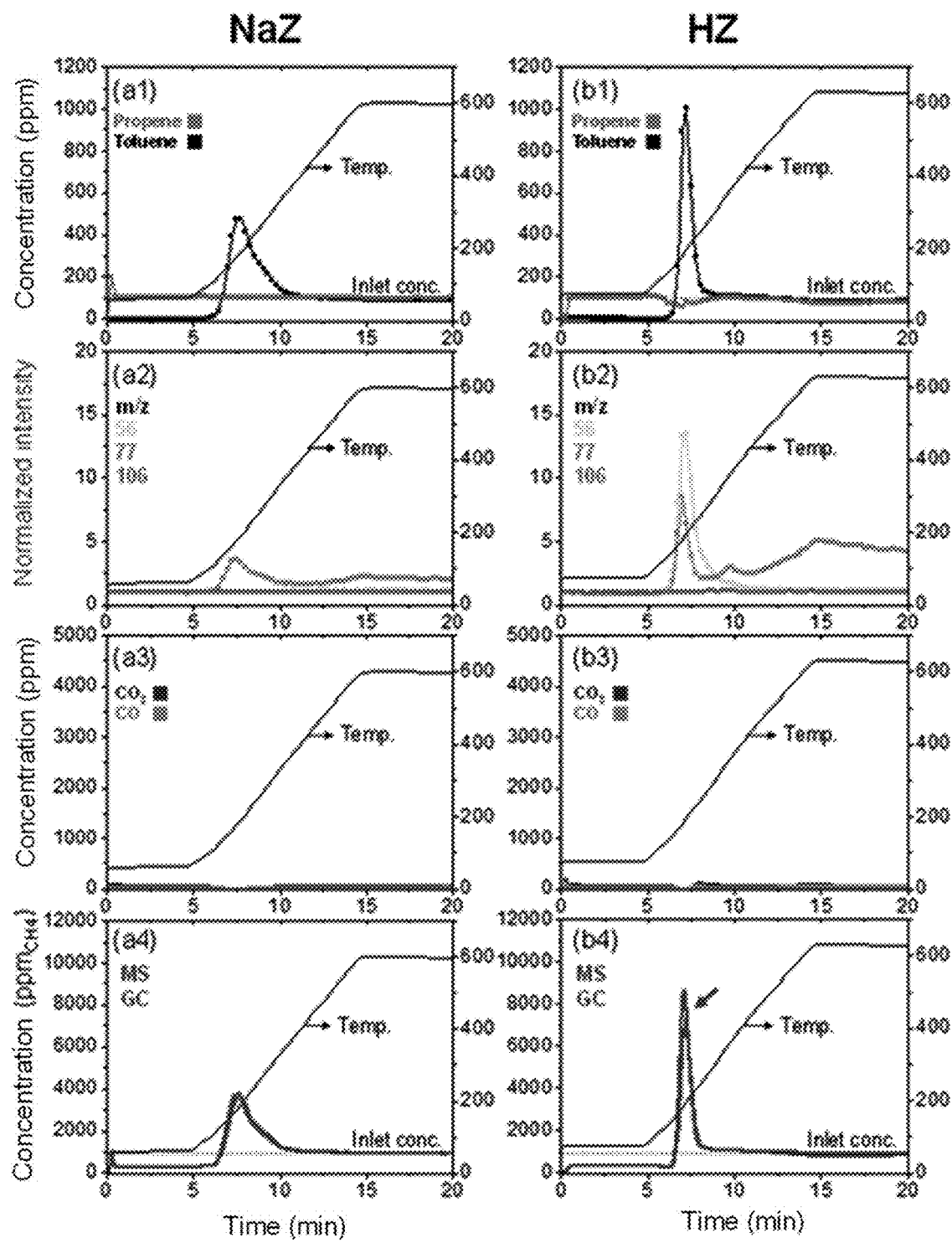

[FIG. 9B]
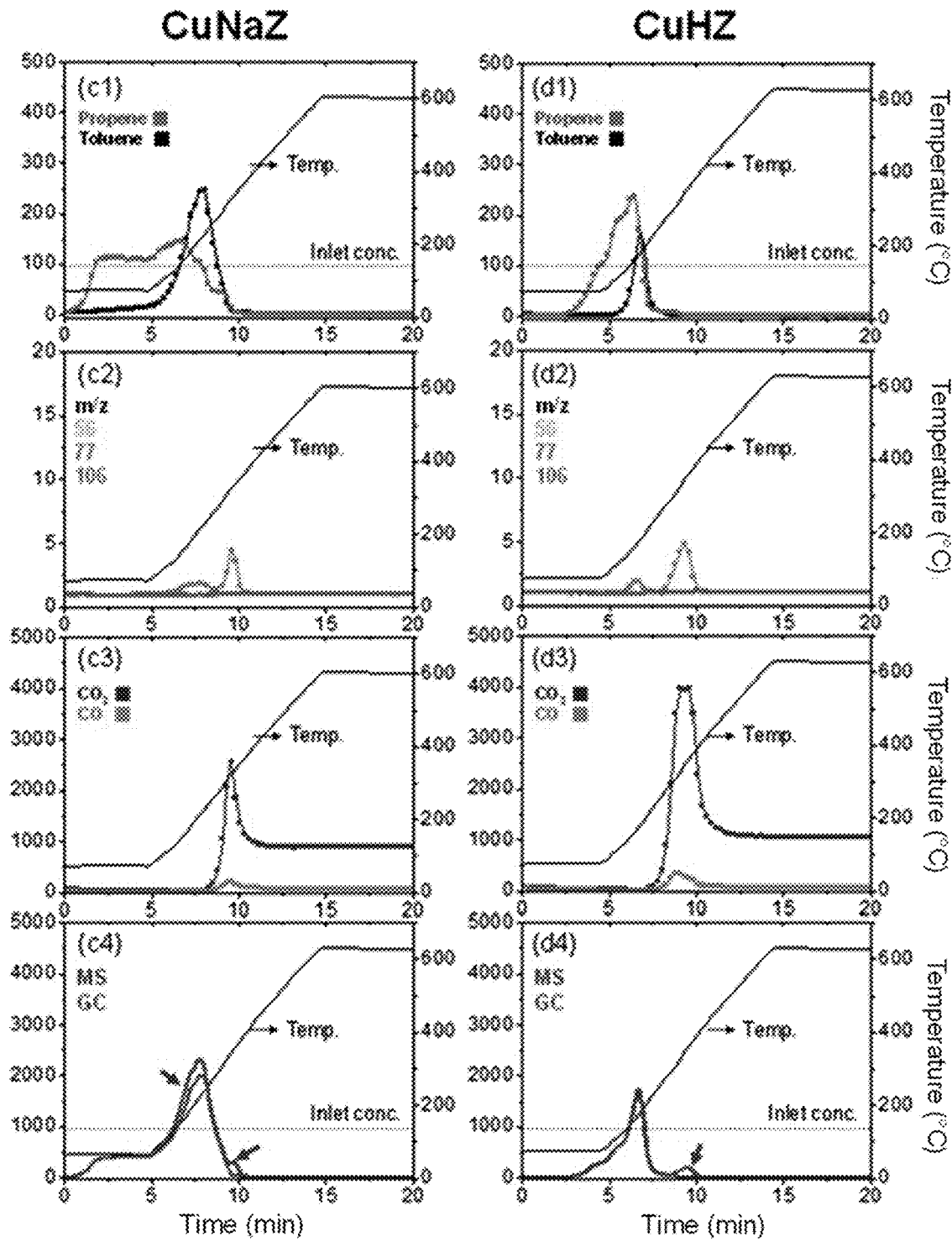

[FIG. 10A]
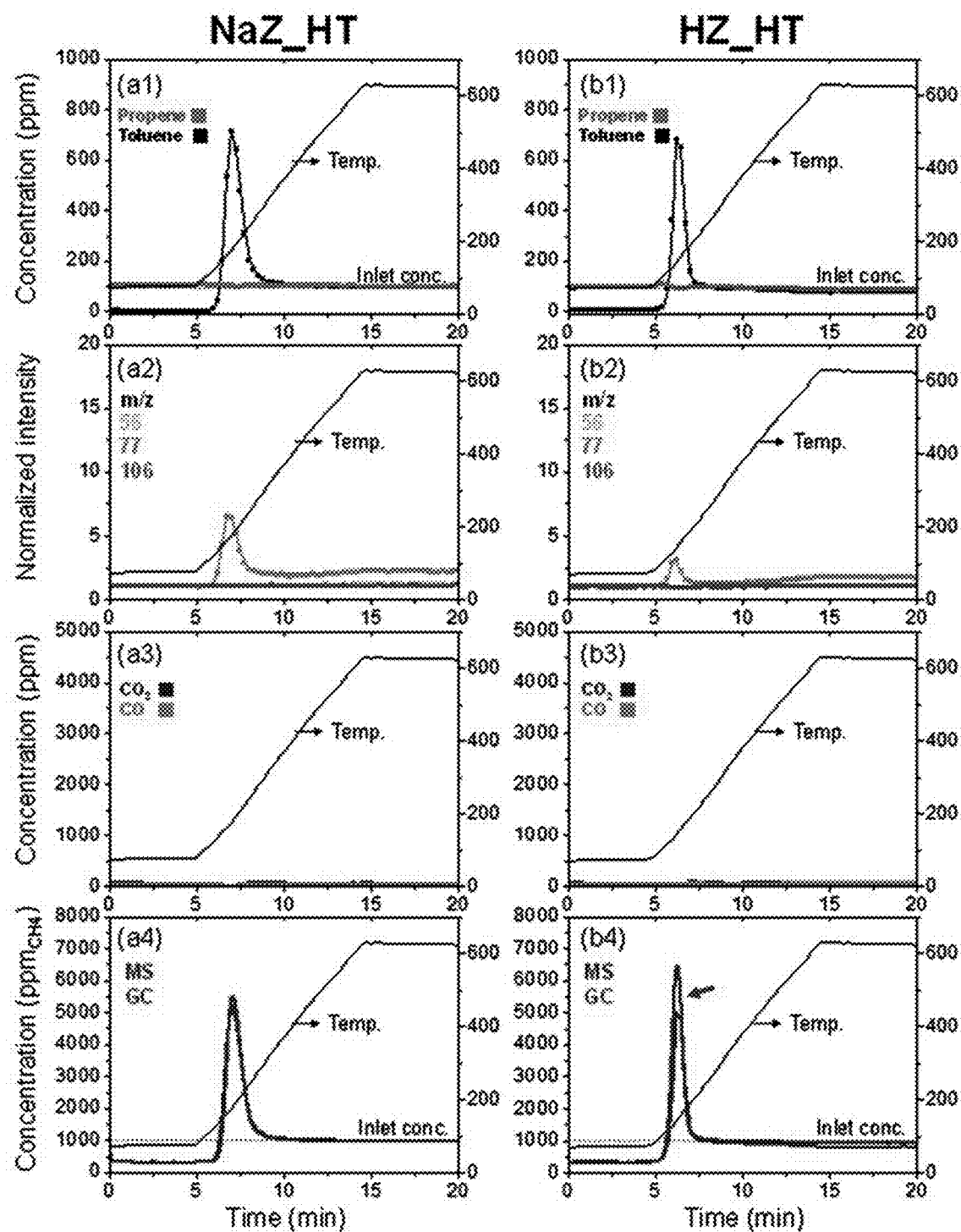

[FIG. 10B]
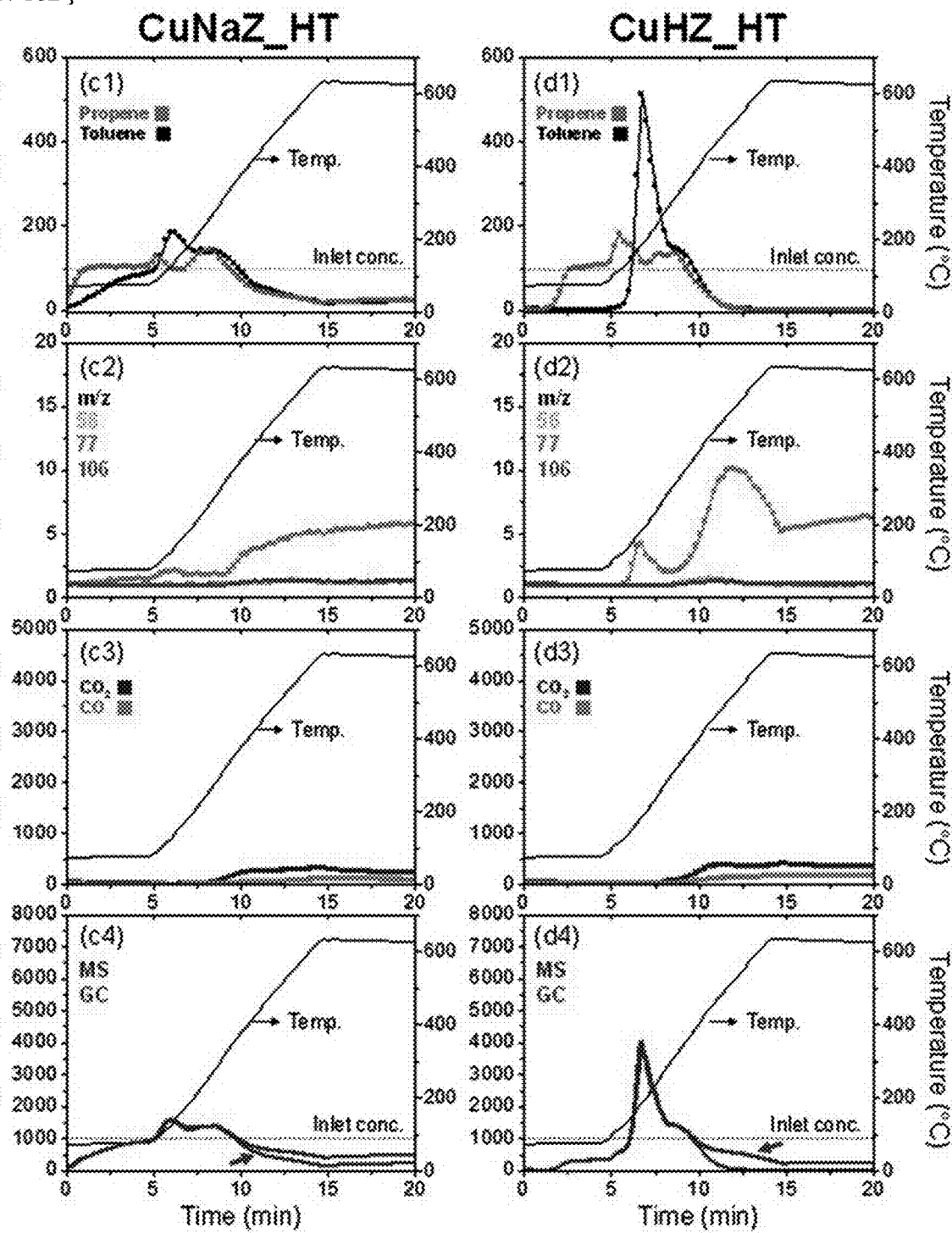

[FIG. 11]
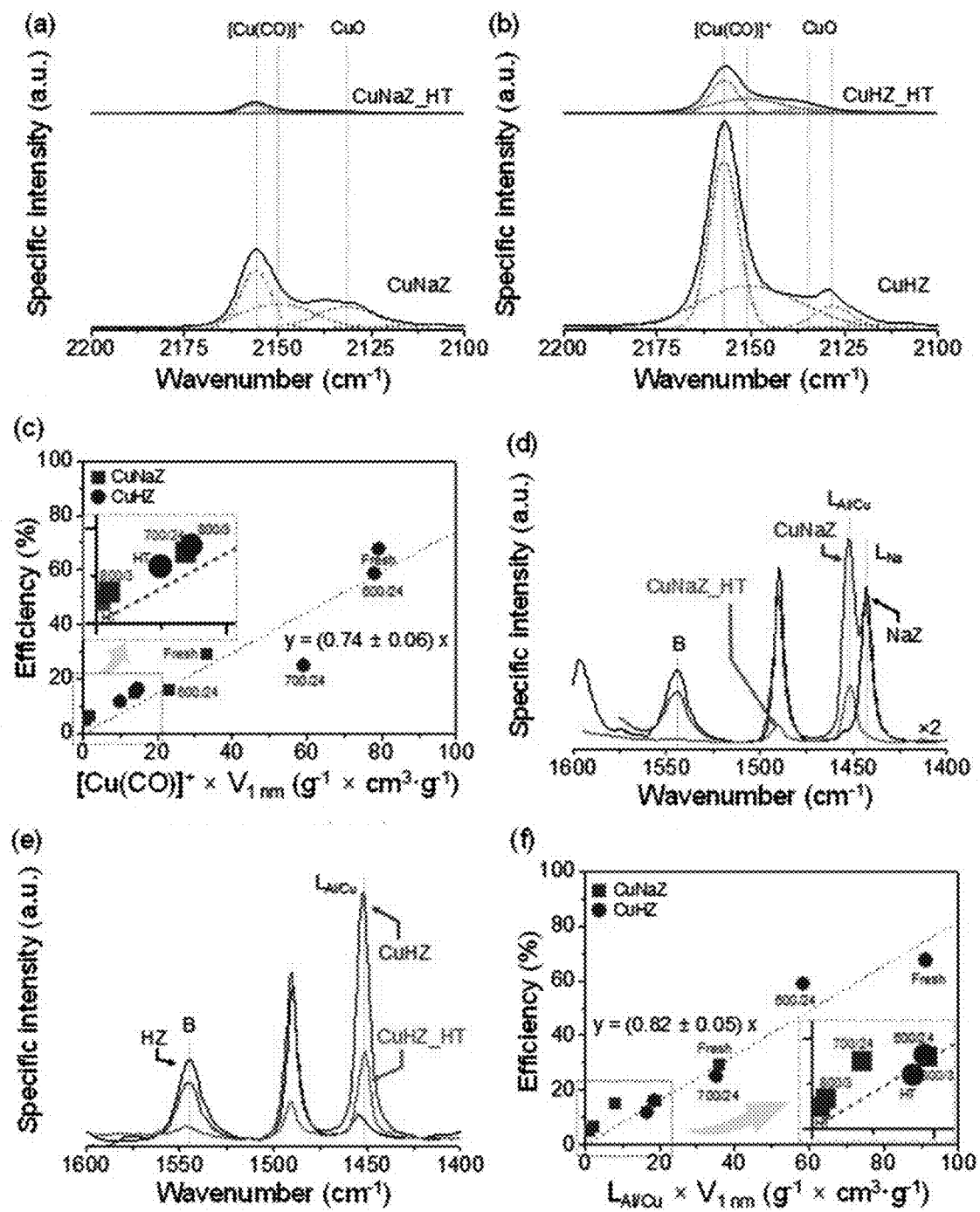

[FIG. 12]
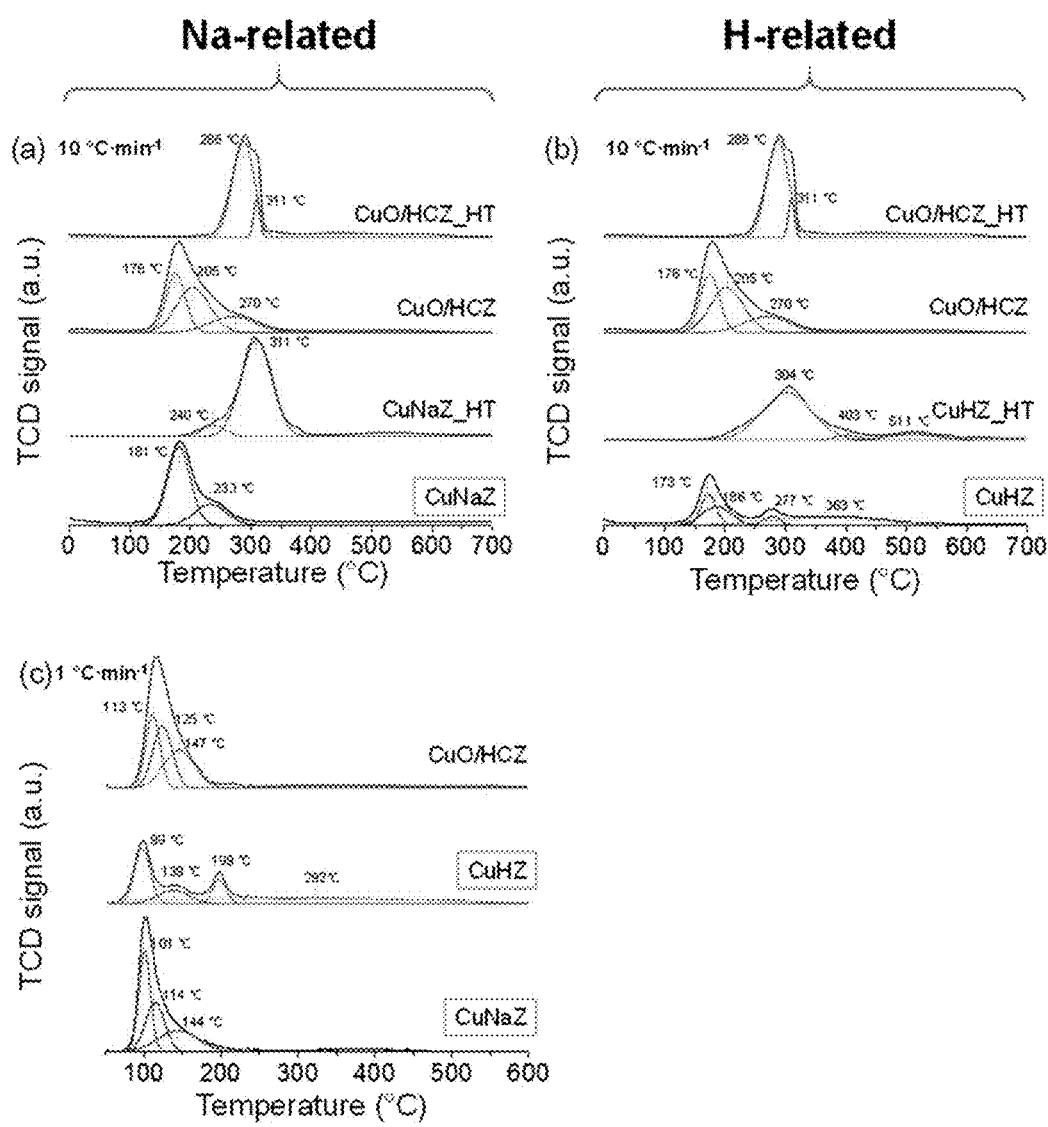

[FIG. 13]
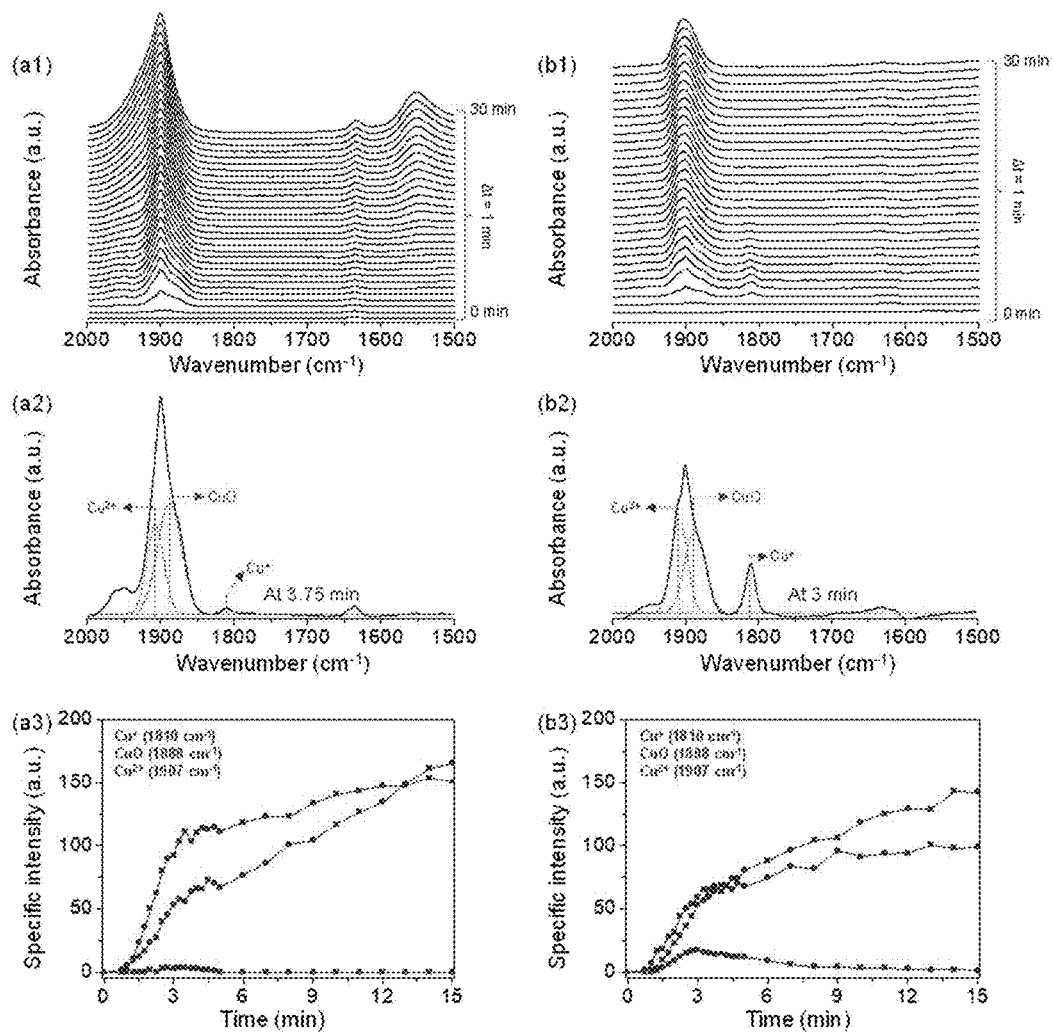

[FIG. 14]
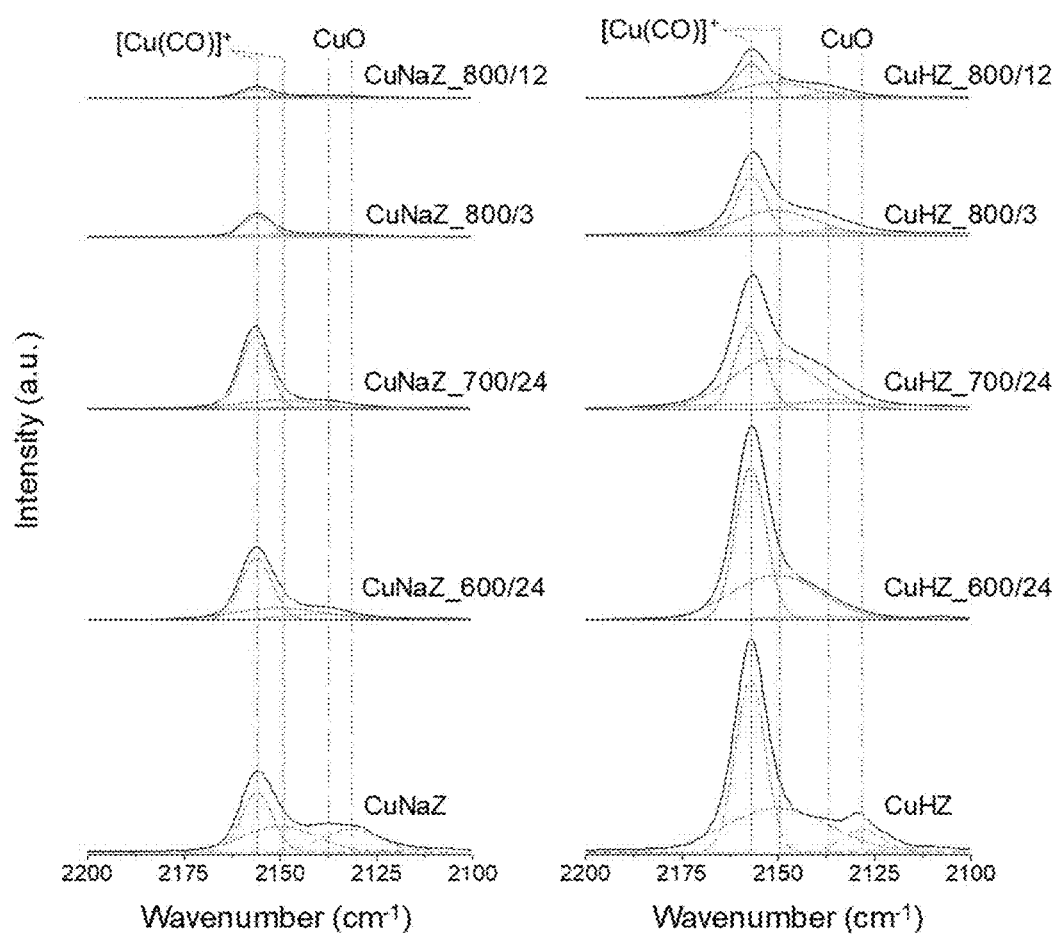

[FIG. 15]
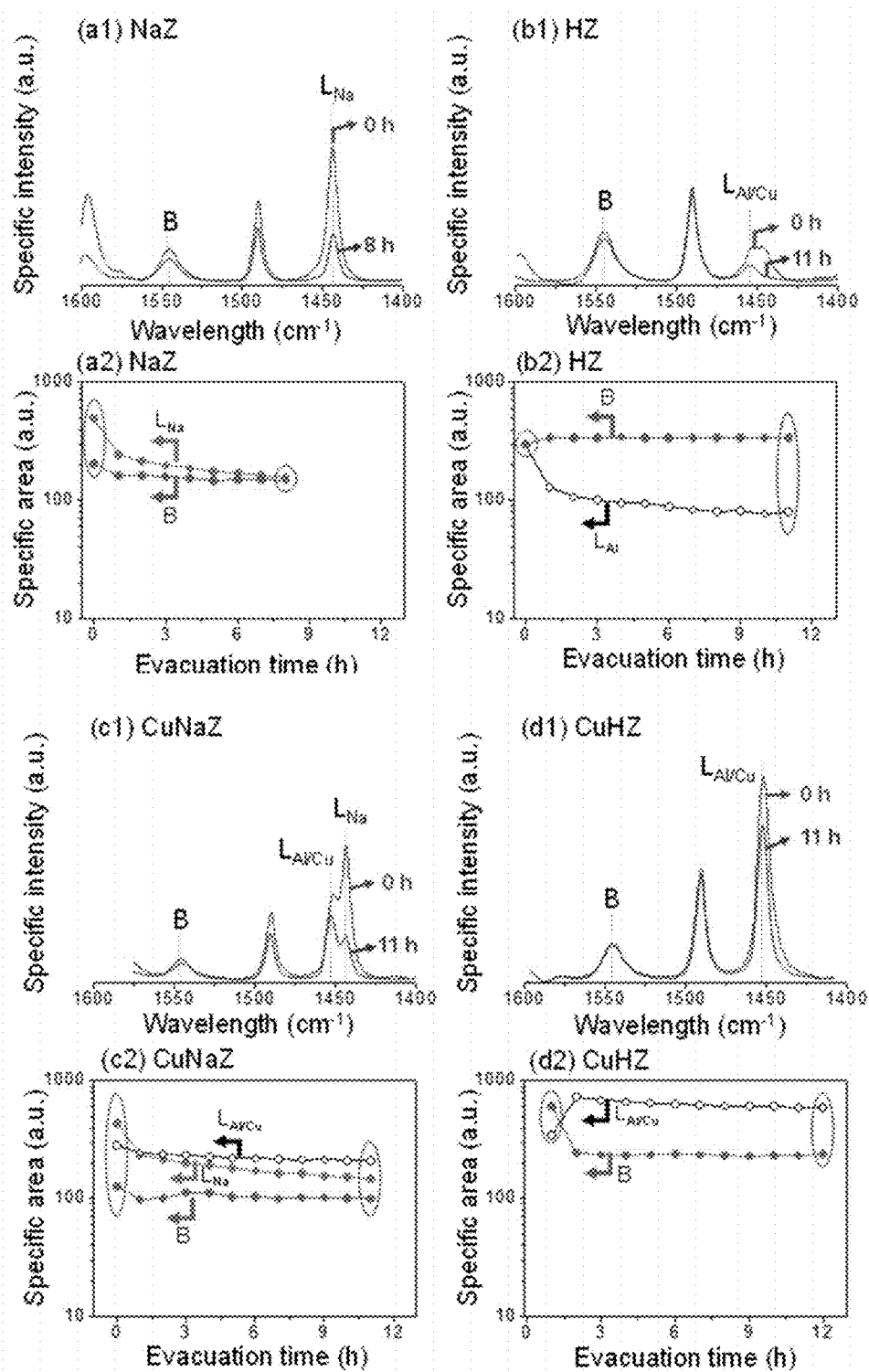

[FIG. 16]
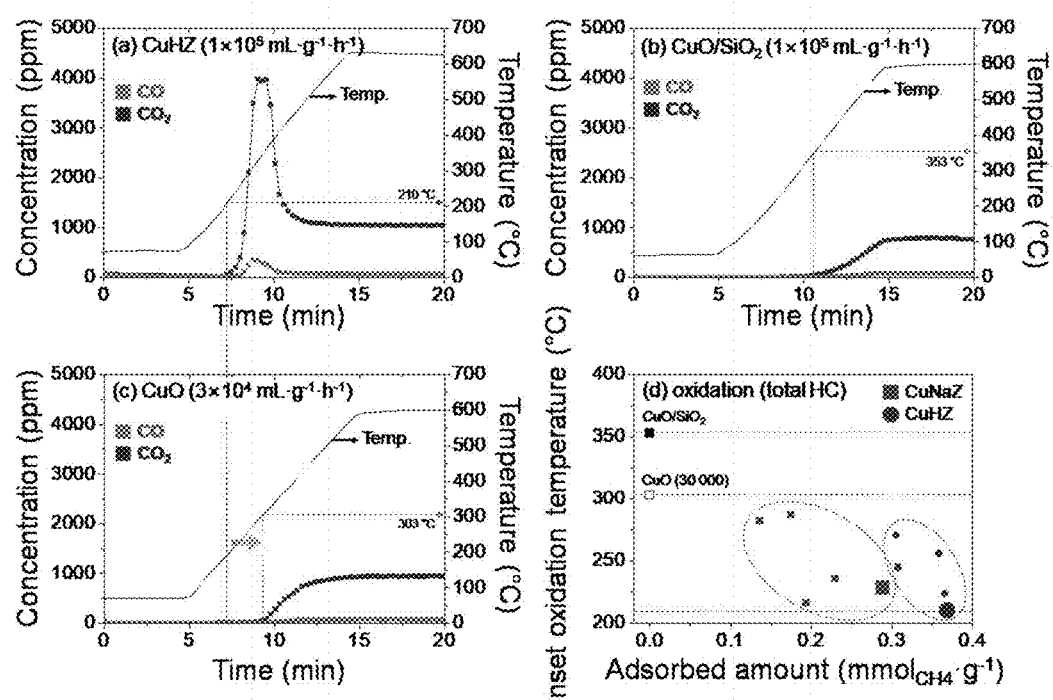

[FIG. 17]
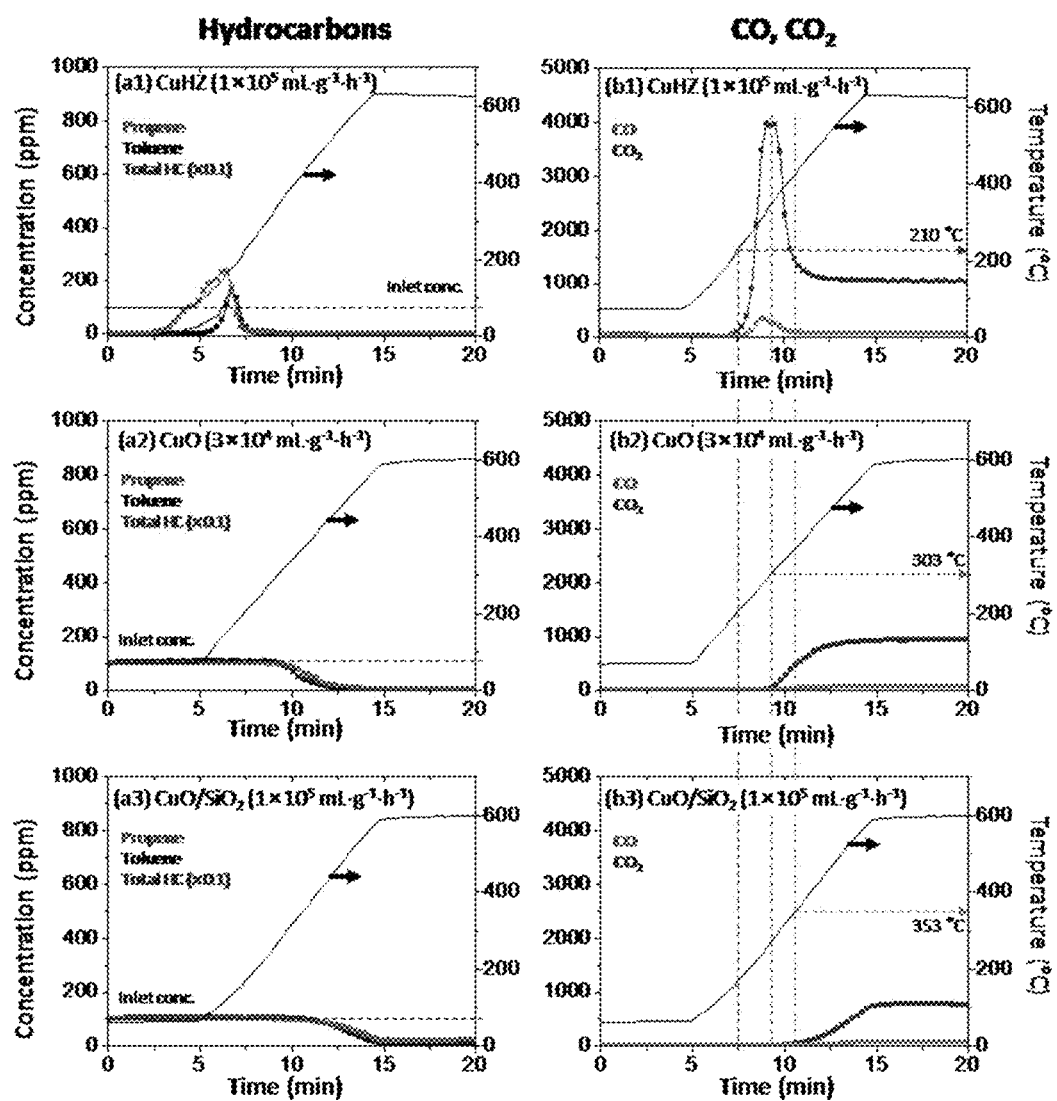

[FIG. 18]
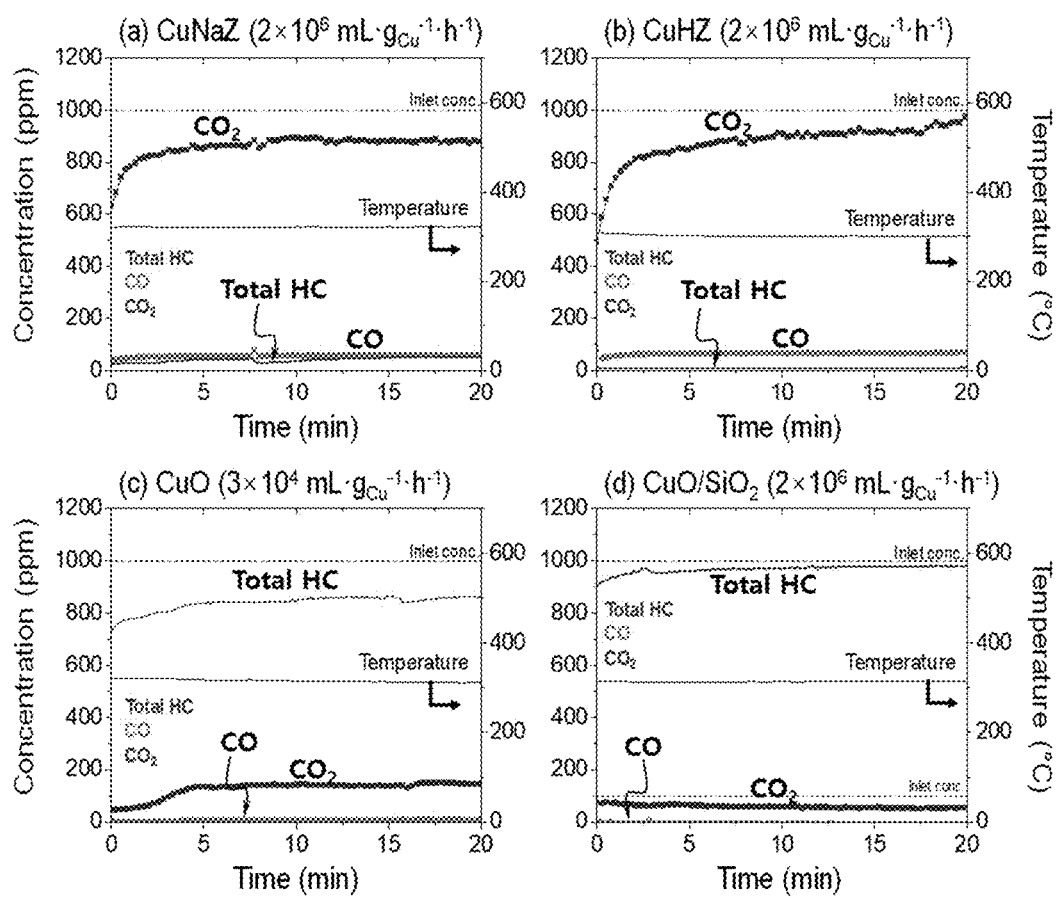

HYDROCARBON ADSORPTION AND DESORPTION COMPLEX COMPRISING ZEOLITE WITH CONTROLLED CATION AND PREPARATION METHOD THEREFOR

CROSS-REFERENCE TO RELATED APPLICATION

This application claims a benefit under 35 U.S.C. § 119(a) of Korean Patent Application No. 10-2020-0158372 filed on Nov. 24, 2020, in the Korean Intellectual Property Office, the entire disclosure of which is incorporated herein by reference for all purposes.

TECHNICAL FIELD

The present disclosure relates to a hydrocarbon adsorption and desorption complex comprising zeolite, and more particularly, to a hydrocarbon adsorption and desorption complex in which metal ions and metal oxides formed on zeolite are effectively dispersed by controlling the type of cations in a zeolite structure, and a preparation method therefor.

BACKGROUND ART

With the growing interest in air pollution, the regulations concerning exhaust gases such as carbon monoxide (CO), nitrogen oxides (NOx), hydrocarbons (HC), particulate matter (PM), or the like emitted from gasoline and diesel vehicles are being tightened in the United States, Europe, etc. In particular, with time from Euro 1 in 1992 to Euro 6d in 2020, hydrocarbon (HC) emissions should be reduced by at least up to 80% compared to 1992. In the case of HC emission from gasoline vehicles, 50 to 80% of hydrocarbons emitted during operation are emitted in the cold start period when three-way catalysts (TWCs, acting on HC oxidation) are not active. Research on hydrocarbon adsorbents (HC traps) is in progress in order to reduce hydrocarbons emitted during the cold start period. The HC trap is a device for adsorbing hydrocarbons emitted in the cold start period and desorbing already adsorbed hydrocarbons when the three-way catalyst reaches the activation temperature (approximately 200 to 300° C.).

A lot of research is being conducted on the use of zeolites with high physical and chemical stability as the HC trap. The performance of the HC trap is tested by measuring the adsorption and desorption of propene and toluene, which are representative hydrocarbon emissions of gasoline vehicles. Research on the performance of the HC trap has been conducted based on a zeolite structure, Si/Al ratio, and present or absence of metal impregnation. The higher the Al content of the zeolite (that is, the smaller the Si/Al value), the more hydrocarbons are adsorbed to the zeolite. In addition, among various zeolite structures, a zeolite socony Mobil-5 (ZSM-5) and beta-structured zeolites show high performance. However, the HC trap made of only zeolite has low hydrocarbon adsorption and oxidation ability at 300° C. or lower, which may lead to problems of insufficient treatment of hydrocarbons generated in the cold start period until the three-way catalyst reaches the activation temperature, and furthermore, deterioration in the performance of the HC trap when a large amount of water (approximately 10 mol %) is present.

In order to solve the above-mentioned problems, there is a need for the development of an adsorbent that adsorbs and oxidizes hydrocarbons at a temperature lower than the activation temperature of the three-way catalyst and that exhibits excellent hydrocarbon adsorption and oxidation ability even in the presence of a large amount of water.

An example of the related art is disclosed in Japanese Unexamined Patent Application Publication No. 2012-512022 (Date: May 31, 2012).

DISCLOSURE OF THE INVENTION

Technical Problem

An object of the present disclosure is to provide a hydrocarbon adsorption and desorption complex of which the hydrocarbon adsorption and oxidation performance is controlled, by controlling the distribution of metal ions and metal oxides through the control of the cation type of zeolite, and a preparation method therefor.

Technical Solution

According to an aspect of the present disclosure, there is provided a hydrocarbon adsorption and desorption complex including: zeolite particles containing hydrogen cations;
metal ions chemically bounded to the zeolite particles; and
metal oxides provided on surface of the zeolite particles,
in which a molar ratio of sodium to aluminum (Na/Al) in the zeolite particles is 0.2 or less, and
an average diameter of the metal oxides is 1 to 10 nm.

According to another aspect of the present disclosure, there is provided a preparation method for a hydrocarbon adsorption and desorption complex, including: preparing zeolite particles containing hydrogen cations by using an ion exchange method; and
forming metal ions and metal oxides by mixing the zeolite containing the hydrogen cations with a solution containing the metal ions,
in which in the preparing of the zeolite particles containing hydrogen cations, a molar ratio of sodium to aluminum (Na/Al) of the zeolite particles is 0.2 or less, and
the metal oxides are formed such that an average diameter of the metal oxides on the zeolite particles is 1 to 10 nm.

Advantageous Effects

The hydrocarbon adsorption and desorption complex according to the present disclosure may control the distribution of the metal ions and metal oxides, thereby making it possible to exhibit the excellent hydrocarbon adsorption ability and oxidation performance even at a temperature lower than the catalyst activation temperature.

Further, the hydrocarbon adsorption and desorption complex according to the present disclosure may increase hydrothermal stability, thereby making it possible to exhibit the excellent hydrocarbon adsorption and desorption performance even after undergoing a hydrothermal treatment process by which a high temperature is applied in the presence of water.

BRIEF DESCRIPTION OF THE DRAWINGS

FIG. 1 shows images of a hydrocarbon adsorption and desorption complex according to an embodiment of the present disclosure which are captured with a scanning electron microscope (SEM) and a transmission electron microscope (TEM).

FIG. 2 is a graph showing physicochemical properties of a hydrocarbon adsorption and desorption complex according to an embodiment of the present disclosure: (a) and (b) X-ray diffraction graphs, (c) and (d) SEM/EDX mapping images, (e) and (f) nitrogen adsorption isotherm graphs, and (g) and (h) $^{29}$Si MAS NMR graphs.

FIG. 3 shows scanning electron microscope (SEM) images and SEM/EDX mapping images of the hydrocarbon adsorption and desorption complex according to an embodiment of the present disclosure: (a) scanning electron microscope images, (b) SEM/EDX mapping images of silicon, (c) SEM/EDX mapping images of aluminum, (d) SEM/EDX mapping images of copper species; (a1) to (d1) images of NaZ, (a2) to (d2) images of HZ, (a3) to (d3) images of the hydrocarbon adsorption and desorption complex (CuNaZ) of Comparative Example 1, and (a4) to (d4) images of the hydrocarbon adsorption and desorption complex (CuHZ) of Example 1.

FIG. 4 shows scanning electron microscope (SEM) images and SEM/EDX mapping images of a hydrocarbon adsorption and desorption complex according to another embodiment of the present disclosure: (a) scanning electron microscope images, (b) SEM/EDX mapping images of silicon, (c) SEM/EDX mapping images of aluminum, (d) SEM/EDX mapping images of copper species; (a1) to (d1) images of NaZ_HT, (a2) to (d2) images of HZ_HT, (a3) to (d3) images of the hydrocarbon adsorption and desorption complex (CuNaZ_HT) of Comparative Example 2, and (a4) to (d4) images of the hydrocarbon adsorption and desorption complex (CuHZ_HT) of Example 2.

FIG. 5 is an X-ray diffraction graph of a HC trap according to Comparative Example.

FIG. 6 shows a nitrogen adsorption isotherm graphs of a HC trap according to Comparative Example: (a) a graph of CuO/NaZ and CuO/NaZ_HT and (b) a graph of CuO/HZ and CuO/HZ_HT.

FIG. 7 shows graphs of cool start test (CST) results of hydrocarbon adsorption and desorption complexes according to an embodiment of the present disclosure: CST results for hydrocarbons of simulated exhaust gases of (a1) to (c1) a sodium cation-containing zeolite and (a2) to (c2) a hydrogen cation-containing zeolite, (a3) the adsorbed amount of propene obtained from the CST results of (a1) and (a2), (b3) the adsorbed amount of toluene obtained from the CST results of (b1) and (b2), and (c3) the total hydrocarbon treatment efficiency of the HC trap before 300° C. obtained from the CST results of (c1) and (c2).

FIG. 8 shows graphs of cool start test (CST) results of hydrocarbon adsorption and desorption complexes according to an embodiment of the present disclosure: (a) graphs of NaZ, (b) graphs of HZ, (c) graphs of the hydrocarbon adsorption and desorption complex (CuNaZ) of Comparative Example 1, and (d) graphs of the hydrocarbon adsorption and desorption complex (CuHZ) of Example 1; (a1) to (d1) graphs under a dry condition without water vapor, and (a2) to (d2) graphs under a wet condition with water vaper added.

FIGS. 9A and 9B shows graphs of cool start test (CST) results of hydrocarbon adsorption and desorption complexes according to an embodiment of the present disclosure: for representative components of the outlet gas stream, (a1) to (a4) of FIG. 9A are results for NaZ, (b1) to (b4) of FIG. 9A are results for HZ, (c1) to (c4) of FIG. 9B are results for the hydrocarbon adsorption and desorption complex (CuNaZ) of Comparative Example 1, and (d1) to (d4) of FIG. 9B are results for the hydrocarbon adsorption and desorption complex (CuHZ) of Example 1; (a1) to (d1) graphs of propene and toluene, (a2) to (d2) graphs of hydrocarbons of m/z=56, 77, 106, (a3) to (d3) graphs of CO and $CO_2$, and (a4) to (d4) graphs of the total hydrocarbons depending on equipment (MS, GC), where dashed lines indicate inlet concentrations of propene (100 ppm), toluene (100 ppm) and the total hydrocarbons (1000 ppm of $CH_4$) in terms of $CH_4$.

FIGS. 10A and 10B shows graphs of cool start test results of hydrocarbon adsorption and desorption complexes according to an embodiment of the present disclosure: for representative components of the outlet gas stream, (a1) to (a4) of FIG. 10A are results for NaZ_HT, (b1) to (b4) of FIG. 10A are results for HZ_HT, (c1) to (c4) of FIG. 10B are results for the hydrocarbon adsorption and desorption complex (CuNaZ_HT) of Comparative Example 2, and (d1) to (d4) of FIG. 10B are results for the hydrocarbon adsorption and desorption complex (CuHZ_HT) of Example 2; (a1) to (d1) graphs of propene and toluene, (a2) to (d2) graphs of hydrocarbons of m/z=56,77,106, (a3) to (d3) graphs of CO and $CO_2$, and (a4) to (d4) graphs of the combined concentration of propene and toluene (MS) and the total hydrocarbon concentration (GC) depending on equipment, where dashed lines indicate inlet concentrations of propene (100 ppm), toluene (100 ppm) and the total hydrocarbons (1000 ppm of $CH_4$) in terms of $CH_4$.

FIG. 11 shows graphs of Fourier transform ultraviolet spectroscopy (FT-IR) spectra of a CO adsorbed sample and a pyridine adsorbed sample of the hydrocarbon adsorption and desorption complex according to an embodiment of the present disclosure and linear regression graphs of the CST efficiencies of fresh and hydrothermally-treated samples as a function of product of microporous volumes: (a) and (b) FT-IR spectra for CO adsorbed samples of a sodium cation-containing hydrocarbon adsorption and desorption complex (CuNaZ, CuNaZ_HT) and a hydrogen cation-containing hydrocarbon adsorption and desorption complex (CuNaZ, CuNaZ_HT), respectively, (d) and (e) FT-IR spectra for pyridine adsorbed samples of the sodium cation-containing hydrocarbon adsorption and desorption complex (NaZ, CuNaZ, CuNaZ_HT) and the hydrogen cation-containing hydrocarbon adsorption and desorption complex (HZ, CuHZ, CuHZ_HT), respectively, and (c) and (f) linear regression graphs of the CST efficiencies of fresh and hydrothermally-treated samples as a function of the product of microporous volumes of up to the 1-nm size ($V_{1\ nm}$) for monocarbonyl species ([Cu(CO)]+) (c) and Lewis acid sites ($L_{Al/Cu}$), respectively.

FIG. 12 shows graphs of a $H_2$-TPR (temperature-programmed reduction) curve of the hydrocarbon adsorption and desorption complexes according to an embodiment of the present disclosure: (a) results for the hydrocarbon adsorption and desorption complexes of Comparative Examples 1 and 2, (b) results for the hydrocarbon adsorption and desorption complexes of Examples 1 and 2, (c) results for the hydrocarbon adsorption and desorption complexes of Example 1 and Comparative Example 1, where (a) and (b) include results for CuO/HCZ obtained by physically mixing CuO with commercially available H-form ZSM-5 (HCZ) and CuO/HCZ_HT obtained by additionally treating CuO/HCZ hydrothermally.

FIG. 13 shows graphs of NO adsorbed Fourier transform ultraviolet spectroscopy (FT-IR) spectra of the hydrocarbon adsorption and desorption complex according to an embodiment of the present disclosure measured at 0° C. and graphs of curves obtained by deconvoluting the spectra into several peaks: (a) graphs of the hydrocarbon adsorption and desorption complex of Comparative Example 1, (b) graphs of the hydrocarbon adsorption and desorption complex of Example 1, (a1) and (b1) spectra shown at one-minute intervals, (a2) and (b2) degradation spectra for wavenumbers of 1907 cm$^{-1}$ (green), 1888 cm$^{-1}$ (red), and 1810 cm$^{-1}$ (blue), which refer to Cu$^{2+}$ ions, CuO, and Cu$^+$ ions, respectively, when the intensity corresponding to Cu$^+$ ions is highest, and (a3) to (b3) graphs showing the intensities corresponding to Cu$^{2+}$ ions, CuO and Cu$^+$ ions.

FIG. 14 shows graphs of CO adsorbed Fourier transform ultraviolet spectroscopy (FT-IR) spectra of the hydrocarbon adsorption and desorption complex according to an embodiment of the present disclosure measured at 30° C. and graphs of curves obtained by deconvoluting the spectra into several peaks: on the left, graphs in the case where the hydrocarbon adsorption and desorption complex (CuNaZ_x/y) of Comparative Example 1 is hydrothermally treated with x (temperature) and y (time), on the right, graphs in the case where the hydrocarbon adsorption and desorption complex (CuHZ_x/y) of Example 1 is hydrothermally treated with x (temperature) and y (time), where a specific area is obtained by integrating peaks centered at 2157 cm$^{-1}$ and 2150 cm$^{-1}$ in the FT-IR spectra, which is indicated in red, and other resolved curves generated from CuO particles at wavenumbers of 2137 cm$^{-1}$ and 2107 cm$^{-1}$ are shown in gray.

FIG. 15 shows graphs of pyridine adsorbed Fourier transform ultraviolet spectroscopy (FT-IR) spectra of the hydrocarbon adsorption and desorption complex according to an embodiment of the present disclosure and specific areas for emission time: (a) graphs of NaZ, (b) graphs of HZ, (c) graphs of the hydrocarbon adsorption and desorption complex (CuNaZ) of Comparative Example 1, (d) graphs of the hydrocarbon adsorption and desorption complex (CuHZ) of Example 1, and (a2) to (d2) spectra measured at zero to eight hours or zero to 11 hours, where the specific areas are obtained by integrating the peaks centered at 1550, 1450 and 1440 cm$^{-1}$ in the pyridine adsorbed FT-IR spectra for B, $L_{Al/Cu}$ and $L_{Na}$.

FIG. 16 shows graphs of results of oxidation of CO and $CO_2$ while the cool start test (CST) of the hydrocarbon adsorption and desorption complex according to an embodiment of the present disclosure is being performed: (a) a graph of the hydrocarbon adsorption and desorption complex (CuHZ) of Example 1, (b) a graph of CuO/SiO$_2$, (c) a graph of CuO, and (d) a graph of an onset oxidation temperature of $CO_2$ and the adsorbed amount of the fresh and hydrothermally-treated samples for total hydrocarbons.

FIG. 17 shows graphs of the cool start test (CST) results for released gas in an outlet stream of the hydrocarbon adsorption and desorption complex according to an embodiment of the present disclosure; (a1) to (a3) graphs of hydrocarbons and (b1) to (b3) graphs of CO and $CO_2$, where the upper part is a graph of the hydrocarbon adsorption and desorption complex (CuHZ) of Example 1, the middle part is a graph of CuO, and the lower part is a graph of CuO/SiO$_2$.

FIG. 18 shows graphs of an oxidation performance of the hydrocarbon adsorption and desorption complex according to an embodiment of the present disclosure for released gas in the outlet stream at 300° C.: (a) a graph of the hydrocarbon adsorption and desorption complex (CuNaZ) of Comparative Example 1, (b) a graph of the hydrocarbon adsorption and desorption complex (CuHZ) of Example 1, (c) a graph of CuO, and (d) a graph of CuO/SiO$_2$.

MODE FOR CARRYING OUT THE INVENTION

Hereinafter, in order to describe the present disclosure more specifically, preferred embodiments according to the present disclosure will be described in more detail with reference to the accompanying drawings. However, the present disclosure is not limited to the embodiments described herein and may be embodied in other forms.

In the present specification, 'total hydrocarbons' refer to hydrocarbons based on methane. Specifically, total hydrocarbons are obtained by converting propene, toluene, or the like into values corresponding to methane through gas chromatography (GC FID), and quantifying the converted values as the amount of methane.

Until now, HC traps have been reported in which copper-impregnated zeolite is provided through an ion exchange process, or ion exchange is performed using a larger amount of copper and some remaining copper is present in the form of copper oxide, in order to improve hydrocarbon adsorption performance.

The development of the hydrocarbon adsorption and desorption complexes in the related art has been studied by controlling the Si/Al ratio, structure, and type of impregnated metal of zeolite; however, the present disclosure relates to a hydrocarbon adsorption and desorption complex having excellent hydrocarbon adsorption and oxidation ability by controlling the distribution of metal ions and metal oxides through the control of the type of cations of an active site of the same type of zeolite.

The present disclosure provides a hydrocarbon adsorption and desorption complex including: zeolite particles containing hydrogen cations;
metal ions chemically bounded to the zeolite particles; and
metal oxides provided on surfaces of the zeolite particles, in which
a molar ratio of sodium to aluminum (Na/Al) of the zeolite particles is 0.2 or less, and an average diameter of the metal oxides is 1 to 10 nm.

The zeolite particle may be a zeolite socony mobil-5 (ZSM-5)-based zeolite.

The zeolite particle containing hydrogen cations is zeolite having an Si/Al ratio of approximately 10, to the active site of which hydrogen cations are bounded.

In addition, the molar ratio of sodium to aluminum (Na/Al) of the zeolite particles may be 0.2 or less, 0.15 or less, or 0.05 or less. Having the molar ratio of sodium to aluminum as described above means that the zeolite particles contain more hydrogen cations instead of sodium cations, and having the molar ratio of sodium to aluminum of 0.2 or less means that the hydrogen cation-containing zeolite (H-form zeolite) is formed. When hydrogen cations are bound to the zeolite active site as described above, the content of impregnated metal ions is high, and the size of the metal oxides formed on the surface of the zeolite is small, and thus the adsorption performance and oxidation performance of the hydrocarbon adsorption and desorption complex are improved. The sodium cations and hydrogen cations are chemically bounded to the zeolite active site.

The metal ions may be cations of any one or more metals of elements of Groups 3 to 12. Specifically, the metal ions may be cations of any one or more metals of iron, cobalt, nickel, copper, zinc, rhodium, and cadmium. More specifically, the metal ions may be cations of monovalent iron, divalent iron, trivalent iron, monovalent cobalt, divalent cobalt, monovalent nickel, divalent nickel, monovalent copper, or divalent copper. The metal ions may be bounded inside the pores formed in the zeolite particles to improve the hydrocarbon adsorption ability.

The metal oxides may be cations of any one or more metals of elements of Groups 3 to 12. Specifically, the metal oxides may be oxides of any one or more metals of iron, cobalt, nickel, copper, zinc, rhodium, and cadmium. More specifically, the metal oxide may be FeO, $Fe_3O_4$, $Fe_2O_3$, $Co_3O_4$, CoO, NiO, $Cu_2O$, $Cu_2O_3$, or CuO.

For example, the metal oxides are formed on the surfaces of zeolite particles, and may have an average diameter of 1 to 10 nm. Specifically, the average diameter of the metal oxides may be 1 to 9 nm, 1 to 7 nm, 2 to 8 nm, or 2 to 6 nm. By forming the metal oxides on the zeolite particles as described above, the hydrocarbon adsorption and desorption complex according to the present disclosure may have an excellent hydrocarbon adsorption performance, low hydrocarbon oxidation temperature and high hydrothermal stability.

The size of the hydrocarbon adsorption and desorption complex may be 50 to 5000 nm. Specifically, the size of the hydrocarbon adsorption and desorption complex may be 50 to 2000 nm or 300 to 1500 nm.

In addition, the hydrocarbon adsorption and desorption complex is one in which fine pores are formed in the zeolite particles, metal ions are bound inside the pores formed in the zeolite particles, and the metal oxides are provided on the surfaces of the zeolite particles.

The hydrocarbon adsorption and desorption complex according to the present disclosure may have a micropore volume $V_1$ having a size of 1 nm or less with a volume ($V_1$) of 0.1 $cm^3$/g or more, 0.1 to 0.2 $cm^3$/g, 0.1 to 0.15 $cm^3$/g, or 0.12 to 0.13 $cm^3$/g. With the micropores formed in the zeolite particles and metal ions bound in the micropores as described above, the adsorption ability for hydrocarbons such as propene and toluene may be improved.

The metal cations are present in an amount of 50 to 80% of the maximum weight that may be impregnated into the zeolite, and the metal oxides are formed from remaining metals that are not impregnated into the zeolite as metal cations.

The hydrocarbon adsorption and desorption complex according to the present disclosure, which has the above characteristics, may satisfy the following Formula 1:

$$\left[1 - \frac{Q_{Out}}{Q_{In}}\right] \times 100 > A \qquad \text{[Formula 1]}$$

where $Q_{In}$ represents the amount of hydrocarbons injected into the hydrocarbon adsorption and desorption complex, $Q_{out}$ represents the amount of hydrocarbons released through the hydrocarbon adsorption and desorption complex, and A is a number of 30 or more, and represents a hydrocarbon treatment efficiency.

Formula 1 is obtained by measuring the amount of hydrocarbons injected into the hydrocarbon adsorption and desorption complex and the whole amount of hydrocarbons released from the hydrocarbon adsorption and desorption complex, and calculating the whole hydrocarbon adsorption rate of the hydrocarbon adsorption and desorption complex through the ratio between the amount of total hydrocarbons injected into the hydrocarbon adsorption and desorption complex and the whole amount of hydrocarbons released through the hydrocarbon adsorption and desorption complex until the time when the temperature reaches 300° C. In this case, the whole hydrocarbon treatment efficiency A may represent 30 or more, 40 or more, 50 or more, 55 or more, or 60 or more.

In addition, the hydrocarbon adsorption and desorption complex according to the present disclosure may represent the adsorption of hydrocarbons at a temperature of 300° C. or less, and may represent the oxidation of hydrocarbons at a temperature of 180° C. or more. Specifically, the hydrocarbon adsorption and desorption complex of the present disclosure may represent the adsorption of hydrocarbons at a temperature of 70° C. to 300° C. or 100° C. to 300° C., or may represent the oxidation of hydrocarbons at a temperature of 210° C. or more, 220° C. or more, 230° C. or more, or 240° C. or more. Usually, 50 to 80% of hydrocarbons emitted during travelling occur in the cold start period (300° C. or less), and due to the above characteristics, the hydrocarbon adsorption and desorption complex according to the present disclosure may efficiently adsorb and oxidize hydrocarbons even in the cold start period, and exhibit high hydrothermal stability.

In addition, the hydrocarbon adsorption and desorption complex according to the present disclosure may have the total hydrocarbon adsorbed amount of 0.32 to 1.5 $mmol_{CH4}$/g, and a hydrocarbon oxidation start temperature of 180 to 350° C. Specifically, the hydrocarbon adsorption and desorption complex of the present disclosure may have the total hydrocarbon adsorbed amount of 0.32 to 1.0 $mmol_{CH4}$/g, 0.32 to 0.8 $mmol_{CH4}$/g, or 0.32 to 0.4 $mmol_{CH4}$/g, and may have the hydrocarbon oxidation start temperature of 180 to 320° C., 180 to 300° C. or 180 to 250° C. In this case, the oxidation start temperature refers to the temperature at which the amount of $CO_2$ produced is 5% or more of the total hydrocarbons.

The hydrocarbon adsorption and desorption complex according to the present disclosure may be hydrothermally treated by injecting 5 to 15 mol % of water vapor at 600° C. to 900° C. for one hour to 36 hours. Specifically, the hydrocarbon adsorption and desorption complex may be thermally treated by injecting 5 to 15 mol % of water vapor at a temperature of 600° C. to 850° C., 600° C. to 800° C., 600° C. to 750° C., or 700° C. to 800° C. for one hour to 24 hours, 12 hours to 36 hours, or 12 hours to 24 hours. At this time, an hourly gas flow rate of a simulated exhaust gas including water vapor to the weight of the hydrocarbon adsorption and desorption complex may be 10,000 to 200,000 mL/g·h or 100,000 to 200,000 mL/g·h, which is a severe condition similar to that when a vehicle is operated for a long time. The hydrothermal-treated hydrocarbon adsorption and desorption complex as described above may have reduced performance of adsorbing and oxidizing hydrocarbons in the presence of water vapor, and may have reduced durability.

For example, in the hydrothermal-treated hydrocarbon adsorption and desorption complex, A, which is the hydrocarbon treatment efficiency in Formula 1, may be 5 or more, 6 or more, 8 or more, or 10 or more. The hydrothermal-treated hydrocarbon adsorption and desorption complex exhibits a relatively low hydrocarbon treatment efficiency compared to the hydrocarbon adsorption and desorption complex that is not subjected to hydrothermal treatment (fresh hydrocarbon adsorption and desorption complex); however, in the comparison after the hydrothermal treatment, the hydrocarbon adsorption and desorption complex having a molar ratio of sodium to aluminum (Na/Al) of 0.2 or less exhibits more improved heat resistance and excellent adsorption ability than the hydrocarbon adsorption and desorption complex in which the cations are mostly Na.

In addition to hydrocarbon adsorption performance, the hydrocarbon adsorption and desorption complex according to the present disclosure may be utilized as a selective catalytic reduction (SCR), and in this case, may effectively remove nitrogen oxides ($NO_x$), and thus exhibit air purification ability.

In addition, a preparation method for a hydrocarbon adsorption and desorption complex, including: preparing zeolite particles containing hydrogen cations by using an ion exchange method; and forming metal ions and metal oxides by mixing the zeolite containing the hydrogen cations with a solution containing the metal ions, in which in the preparing of the zeolite particles containing hydrogen cations, a molar ratio of sodium to aluminum (Na/Al) of the zeolite particles is 0.2 or less, and the metal oxides are formed such that an average diameter of the metal oxides on the zeolite particles is 1 to 10 nm.

The zeolite particle may be a zeolite socony mobil-5 (ZSM-5).

The zeolite particle may be a hydrogen cation-containing zeolite. The hydrogen cation-containing zeolite is prepared by replacing sodium cations in the active site of the zeolite with hydrogen cations using an ion exchange method in the zeolite precursor.

The hydrogen cation-containing zeolite is zeolite having an Si/Al ratio of approximately 10, to the active site of which hydrogen cations are bounded. When cations in the active site of the zeolite are replaced with hydrogen cations as described above, the content of impregnated metal ions is high, and the size of the metal oxides formed on the surface of the zeolite is small, and thus the adsorption performance of the hydrocarbon adsorption and desorption complex is improved.

The zeolite prepared in the preparing of the zeolite particles containing hydrogen cations may include a hydrogen cation-containing zeolite (H-form zeolite) and a sodium cation-containing zeolite (Na-form zeolite). The hydrogen cation-containing zeolite and sodium cation-containing zeolite are prepared by replacing sodium cations in the active site of the zeolite with hydrogen cations using a method of calcining the zeolite precursor after the ion exchange.

The preparing of the zeolite containing the hydrogen cations may be performed by mixing the zeolite particles with ammonium salt aqueous solution, and the ammonium salt aqueous solution may contain any one or more of ammonium sulfate, ammonium nitrate, ammonium chloride, ammonium acetate, ammonium persulfate, aqueous ammonia, ammonium bicarbonate, and ammonium formate.

The zeolite may be the sodium cation-containing zeolite (Na-form zeolite), and when the ammonium salt aqueous solution and the sodium cation-containing zeolites are mixed, the ammonium cations are replaced with the sodium cations contained in the zeolite. Then, through the calcining process, the replaced ammonium cations are changed into hydrogen cations. In this way, the molar ratio of sodium of the zeolite particles may be decreased, and the molar ratio of sodium of the zeolite particles may be controlled by controlling the reaction time between the ammonium salt aqueous solution and the zeolite particles.

Specifically, the concentration of the ammonium salt aqueous solution may be 1 M to 5 M, 1 M to 4 M, or 1 M to 3 M, and the ammonium salt aqueous solution and the zeolite particles may be mixed for 20 hours to 30 hours, 22 hours to 30 hours, or 23 hours to 27 hours. By mixing and reacting the ammonium salt aqueous solution with the zeolite particles, sodium cations of the zeolite particles may be replaced with hydrogen cations.

Specifically, for the particles subjected to the ion exchange method, the molar ratio of sodium to aluminum (Na/Al) of the zeolite particles may be 0.2 or less, 0.15 or less, or 0.05 or less. Having the above molar ratio of sodium to aluminum means that the zeolite containing hydrogen cations instead of sodium cations is included. When hydrogen cations are bound to the zeolite active site as described above, the content of impregnated metal ions is high, and the size of the metal oxides formed on the surface of the zeolite is small, and thus the adsorption performance of the hydrocarbon adsorption and desorption complex is improved.

Then, a method is repeatedly performed three or more times in which centrifugation and decantation of a mixed solution of zeolite particles and the ammonium salt aqueous solution are performed to obtain a precipitate, and the obtained precipitate is mixed with the ammonium salt aqueous solution to obtain a precipitate again.

The obtained precipitate may be calcined at a temperature of 500 to 700° C. for 10 hours to 20 hours under the condition of an air flow of 300 mL/min. Specifically, calcination may be performed by heating the obtained precipitate at a temperature of 500 to 650° C. or 500 to 600° C. under an airflow of 300 mL/min at a ramp rate of approximately 1° C./min for 10 hours to 17 hours or 10 hours to 15 hours. Through the above process, zeolite particles in which sodium cations have been replaced with hydrogen cations may be prepared, and micropores may be formed in the zeolite particles.

The forming of the metal ions and the metal oxides may be performed by mixing the zeolite particles in which sodium cations are replaced with hydrogen cations in a metal precursor solution containing metal ions by using a wet impregnation method, where the content of the metal may be 1 to 9 wt. %, 2 to 8 wt. %, 3 to 8 wt. %, or 4 to 7 wt. %. Additionally, drying and calcining may be further included.

Specifically, in the forming of the metal ions and the metal oxides, the zeolite particles may be impregnated with metal ions and metal oxides by calcining the zeolite particles impregnated with metal ions and metal oxides using a wet impregnation method at a temperature of 500 to 700° C. for two to 10 hours under the airflow of 300 mL/min. Specifically, calcination may be performed by heating the zeolite particles impregnated with metal ions and metal oxides at a temperature of 500 to 650° C. or 500 to 600° C. under the airflow of 300 mL/min at a ramp rate of approximately 1° C./min for two to eight hours or three to seven hours. Through the above process, the zeolite particles where sodium cations are replaced with hydrogen cations may include metal ions and metal oxides, and more specifically, metal ions may be impregnated into the micropores of the zeolite particles and metal oxides may be formed on the surfaces of the zeolite particles.

The metal ions may include cations of any one or more metals of elements of Groups 3 to 12. Specifically, the metal ions include cations of any one or more metals of iron, cobalt, nickel, copper, zinc, rhodium, and cadmium. More specifically, the metal ions may be cations of monovalent iron, divalent iron, trivalent iron, monovalent cobalt, divalent cobalt, monovalent nickel, divalent nickel, monovalent copper, or divalent copper.

The metal oxides formed by impregnating the solution containing the metal ions into the zeolite may be oxides of any one or more metals of elements of Groups 3 to 12. Specifically, the metal oxides may be oxides of any one or more metals of iron, cobalt, nickel, copper, zinc, rhodium, and cadmium. More specifically, the metal oxide may be $FeO$, $Fe_3O_4$, $Fe_2O_3$, $Co_3O_4$, $CoO$, $NiO$, $Cu_2O$, $Cu_2O_3$, or $CuO$.

The metal oxides may be formed on the zeolite particles through the forming of the metal ions and the metal oxides, and the average diameter of the formed metal oxides may be 1 to 10 nm. Specifically, the average diameter of the metal oxides may be 1 to 9 nm, 1 to 7 nm, 2 to 8 nm, or 2 to 6 nm. By impregnating the metal ions into the zeolite particles and forming the oxides on the zeolite particles as described above, the hydrocarbon adsorption and desorption complex according to the present disclosure may have excellent hydrocarbon adsorption performance, low hydrocarbon oxidation temperature, and high hydrothermal stability.

The hydrocarbon adsorption and desorption complex prepared through the above process has micropores having a size of 1 nm or less with a volume ($V_1$) of 0.1 cm$^3$/g or more, 0.1 to 0.2 cm$^3$/g, 0.1 to 0.15 cm$^3$/g, or 0.12 to 0.13 cm$^3$/g, the metal cations may be present in an amount of 50 to 80% of the maximum weight that may be impregnated into the zeolite, and the metal oxides may be formed by remaining metals that are not impregnated into the zeolite as metal cations.

The preparation method for the hydrocarbon adsorption and desorption complex according to the present disclosure further includes, after the forming of the metal ions and the metal oxides, performing hydrothermal treatment by injecting 5 to 15 mol % of water vapor at a temperature of 600° C. to 900° C. for one hour to 36 hours. Specifically, the hydrothermal treatment may be performed by thermally treating injected 5 to 15 mol % of water vapor at a temperature of 600° C. to 800° C., 600° C. to 750° C., 600° C. to 700° C., or 700° C. to 800° C. for one hour to 24 hours, 12 hours to 36 hours, or 12 hours to 24 hours. At this time, an hourly gas flow rate of simulated exhaust gas containing water vapor to the weight of the hydrocarbon adsorption and desorption complex may be 10,000 to 200,000 mL/g·h or 100,000 to 200,000 mL/g·h, which is a severe condition similar to those applied to the HC trap when a vehicle travels for a long time.

The hydrocarbon adsorption and desorption complex obtained through the hydrothermal treatment exhibits a relatively lower hydrocarbon treatment efficiency than the fresh hydrocarbon adsorption and desorption complex; however, in the comparison after the hydrothermal treatment, the hydrocarbon adsorption and desorption complex having a molar ratio of sodium to aluminum (Na/Al) of 0.2 or less exhibits more improved heat resistance and excellent adsorption ability than the hydrocarbon adsorption and desorption complex in which the cations are mostly Na.

In addition, the present disclosure provides a hydrocarbon adsorption and desorption complex for vehicles including the hydrocarbon adsorption and desorption complex according to the aspect described above. The hydrocarbon adsorption and desorption complex according to the present disclosure exhibits an excellent adsorption ability and has a hydrocarbon oxidation ability at a temperature of approximately 180° C., and thus the adsorbed hydrocarbon is oxidized even at a relatively low temperature, and hydrothermal stability is ensured at a high temperature. Therefore, the hydrocarbon adsorption and desorption complex according to the present disclosure may be applied to the removal of hydrocarbons emitted from automobile exhaust gas, and may produce an atmospheric purification effect by showing excellent hydrocarbon adsorption and oxidation ability even in the cold start period before the three-way catalyst is sufficiently active.

Hereinafter, examples of the present disclosure will be described. However, the following examples are only preferred examples of the present disclosure, and the scope of the present disclosure is not limited by the following examples.

EXAMPLES

Example 1 (CuHZ)

Synthesis of NaZ 0.98 g of sodium aluminate (NaAlO$_2$, anhydrous, Sigma-Aldrich), 25.45 g of tetraethyl orthosilicate (TEOS, 98%, Sigma-Aldrich) and 18.26 g of tetrapropylammonium hydroxide (TPAOH, 40 wt % in H$_2$O) was slowly added to 75.3 g of deionized water. The mixture having a Si/Al ratio of approximately 10 was stirred under reflux in silicone oil at 100° C. for three hours, and further stirred at room temperature for 24 hours to synthesize a precursor. The prepared synthetic precursor was poured into a Teflon-lined autoclave, and the sealed autoclave was transferred to a convection oven preheated to 175° C., and subjected to hydrothermal reaction while rotating for three days. Then, a series of centrifugation was repeated, decanted, and then washed three times with deionized water to recover the resulting solid particles. The recovered particles were further calcined at 550° C. for 12 hours at a ramp rate of 1° C./min under an airflow of approximately 300 mL/min in a boxed furnace to synthesize sodium cation-containing zeolite particles (NaZ).

Synthesis of HZ

Then, the sodium cations of the zeolite particles were replaced with hydrogen cations through an ion exchange process. Specifically, 1 g of calcined sodium cation-containing zeolite particles (NaZ) was added to 100 mL of a 1 M ammonium nitrate solution prepared by dissolving 8 g of ammonium nitrate (NH$_4$NO$_3$, 99%, Sigma-Aldrich) in approximately 100 g of deionized water. The resulting suspension was stirred in a shaking machine (SI-300R, Lab Companion) for one day. After stirring, the particles were recovered through centrifugation and decanting. The process of performing stirring and recovery in the ammonium nitrate solution was repeated three times. The recovered sample was dried and calcined at 550° C. for 12 hours at a ramp rate of 1° C./min under the airflow of 300 mL/min to prepare zeolite particles HZ containing hydrogen cations.

Synthesis of CuHZ

Then, a hydrocarbon adsorption and desorption complex was prepared by impregnating 5 wt % copper into the hydrogen cation-containing zeolite particles through a wet impregnation process. Specifically, a 0.04 M copper nitrate II (Cu(NO$_3$)$_2$) solution was prepared by dissolving copper nitrate trihydrate (Cu(NO$_3$)$_2$·3H$_2$O, 98%, Sigma-Aldrich) in approximately 80 g of deionized water. The zeolite particles with the controlled sodium cation ratio were added to the copper nitrate solution to be finally impregnated with approximately 5 wt % Cu. Then, the mixture was put in a rotary evaporator to remove all water, and then Cu-impregnated zeolite particles (CuHZ) were recovered, dried at 100° C. overnight, and calcined in a boxed furnace at 550° C. for six hours at a ramp rate of 1° C./min under the airflow of 300 mL/min to prepare the hydrocarbon adsorption and desorption complex.

Example 2 (CuHZ_HT)

Hydrothermal treatment for the hydrocarbon adsorption and desorption complex prepared in Example 1 was conducted through 10 mol % of H$_2$O steam at 800° C. for 24 hours under an airflow to prepare a hydrocarbon adsorption and desorption complex. At this time, an hourly gas flow rate of a simulated exhaust gas including water vapor to the weight of the hydrocarbon adsorption and desorption complex was approximately 100,000 mL/g·h.

Comparative Example 1 (CuNaZ)

A hydrocarbon adsorption and desorption complex was prepared in the same manner as in Example 1, except that the ion exchange reaction was not performed in Example 1.

Comparative Example 2 (CuNaZ_HT)

Hydrothermal treatment for the hydrocarbon adsorption and desorption complex prepared in Comparative Example 1 was conducted through 10 mol % of $H_2O$ steam at 800° C. for 24 hours under an airflow to prepare a hydrocarbon adsorption and desorption complex. At this time, an hourly gas flow rate of a simulated exhaust gas including water vapor to the weight of the hydrocarbon adsorption and desorption complex was approximately 100,000 mL/g·h.

EXPERIMENTAL EXAMPLE

Experimental Example 1

In order to confirm the form and element ratio of the hydrocarbon adsorption and desorption complex according to the present disclosure, scanning electron microscope (SEM) and transmission electron microscope (TEM) imaging, energy dispersive X-ray (EDX), X-ray diffraction (XRD), and Si MAS NMR spectroscopy were performed on the hydrocarbon adsorption and desorption complexes of Examples 1 and 2 and Comparative Examples 1 to 3, and the results are shown in Tables 1 and 2, and FIGS. 1 to 6.

TABLE 1

| Sample | Si/Al$^a$ | Na/Al$^a$ | Cu wt %$^a$ |
|---|---|---|---|
| NaZ | 11.6 ± 0.5 | 0.9 ± 0.1 | 0.1 ± 0.1 |
| HZ | 10.7 ± 0.5 | 0.1 ± 0.1 | 0.1 ± 0.1 |
| CuNaZ | 10.8 ± 0.8 | 0.9 ± 0.1 | 6.3 ± 2.4 |
| CuHZ | 11.3 ± 1.3 | 0.1 ± 0.1 | 6.4 ± 1.4 |
| CuNaZ_HT | 12.5 ± 1.6 | 0.7 ± 0.2 | 6.3 ± 1.4 |
| CuNaZ_HT | 12.7 ± 2.1 | 0.0 ± 0.0 | 5.8 ± 0.7 |

TABLE 2

| | Textural properties | | | | Acid properties | | |
|---|---|---|---|---|---|---|---|
| Sample | $S_{BET}$ (m$^2$·g$^{-1}$) | $S_{micro}^a$ (m$^2$·g$^{-1}$) | $S_{meso+ext}^a$ (m$^2$·g$^{-1}$) | $V_{1\,nm}^b$ (cm$^3$ g$^{-1}$) | B$^c$ (μmol·g$^{-1}$) | $L_{Al/Cu}^c$ | $L_{Na}^c$ |
| NaZ | 390 | 290 | 100 | 0.13 | 180 | 0 | 200 |
| HZ | 389 | 292 | 96 | 0.13 | 400 | 80 | 0 |
| CuNaZ | 379 | 265 | 114 | 0.13 | 120 | 280 | 200 |
| CuHZ | 370 | 259 | 111 | 0.12 | 270 | 780 | 0 |
| CuNaZ_HT | 71 | 34 | 36 | 0.02 | 10 | 60 | 20 |
| CuNaZ_HT | 196 | 86 | 110 | 0.07 | 30 | 250 | 0 |

FIG. 1 shows images of the hydrocarbon adsorption and desorption complex according to the present disclosure and the hydrocarbon adsorption and desorption complexes of Comparative Examples, which are captured with a scanning electron microscope (SEM) and a transmission electron microscope (TEM). Referring to FIG. 1, (a1) is a scanning electron microscope image of the hydrocarbon adsorption and desorption complex of Comparative Example 1, (a2) is a transmission electron microscope image of the hydrocarbon adsorption and desorption complex of Comparative Example 1, (b1) is a scanning electron microscope image of the hydrocarbon adsorption and desorption complex of Example 1, and (b2) is a transmission electron microscope image of the hydrocarbon adsorption and desorption complex of Example 1. Referring to Table 1, the Si/Al molar ratio, Na/Al molar ratio, and Cu supported amount of the hydrocarbon adsorption and desorption complex according to the present disclosure, which was obtained by carrying out ion exchange reaction on sodium cation-containing zeolite (Na-form ZSM-5) and supporting copper therein, were confirmed through elemental analysis. The Na/Al molar ratio was controlled through an ion exchange reaction. Specifically, it can be seen that although the Si/Al molar ratio and copper content of Examples and Comparative Examples did not differ significantly, the Na/Al molar ratio varies depending on the ion exchange reaction time. More specifically, it can be seen that the Si/Al molar ratio of the hydrocarbon adsorption and desorption complex according to the present disclosure is approximately 10 to 14.

FIG. 2 is a graph showing chemical properties of the hydrocarbon adsorption and desorption complex according to the present disclosure: (a) and (b) X-ray diffraction graphs, (c) and (d) SEM/EDX mapping images, (e) and (f) nitrogen adsorption isotherm graphs, and (g) and (h) $^{29}$Si MAS NMR graphs.

First, referring to the scanning electron microscope images, it was confirmed that the hydrocarbon adsorption and desorption complex (CuHZ) of Example 1, which was subjected to hydrogen cation exchange and copper impregnation, did not change significantly in shape compared to the sodium cation-containing zeolite (NaZ). The hydrogen cation-containing zeolite (HZ) or sodium cation-containing zeolite (NaZ) had a spherical shape with a size of approximately 550±200 nm, and was composed of cubic particles with a size of 60 nm. Referring to Table 1, it can be seen that the hydrogen cation-containing zeolite (HZ) or sodium cation-containing zeolite (NaZ) had a Na/Al molar ratio of approximately 0.1±0.1 and 0.9±0.1, respectively, and hydrogen exchange was thoroughly performed, and it can be seen that after the copper impregnation process, copper ions and copper oxide were effectively impregnated into the HC traps of Example 1 and Comparative Example 1.

Referring to the transmission electron microscope images, it was confirmed that the hydrocarbon adsorption and desorption complex of Comparative Example 1 contained copper oxide particles larger than the hydrocarbon adsorption and desorption complex of Example 1. It was confirmed that the hydrocarbon adsorption and desorption complexes of Example 1 and Comparative Example 1 contained copper oxide particles on the outer surfaces thereof, and the sizes of the copper oxide particles were 6.8±2.0 nm and 3.2±0.7 nm, respectively, and were well distributed on the zeolite particles.

A morphological change was induced in the hydrocarbon adsorption and desorption complexes of Example 2 and Comparative Example 2 subjected to hydrothermally treatment (hydrothermally-treated hydrocarbon adsorption and desorption complexes), such that sharp edges of the above-mentioned 60 nm-sized particles were rounded as indicated by white arrows in (d1), (e1), and (f1) of FIG. 1, but the corresponding elemental composition was similar. In addition, it was confirmed that, as indicated by the orange arrows in (e2) of FIG. 1, in Comparative Example 2, the particle size was increased to approximately 33±12 nm after hydrothermal treatment, but it was composed of small particles with a size of 7.3±1.2 nm. On the contrary, it was confirmed that the copper oxide formed in the hydrocarbon adsorption and desorption complex of Example 2 remained similar to the copper oxide formed in the hydrocarbon adsorption and desorption complex of Example 1.

Referring to FIG. 2, the structure of the hydrocarbon adsorption and desorption complex of Comparative Example 2 showed a greater tendency to collapse and degrade during hydrothermal treatment as compared to the structure of the hydrocarbon adsorption and desorption complex of Example 2. Specifically, referring to FIG. 2a, the XRD pattern of the copper-impregnated ZSM-5 zeolite was very similar to the XRD pattern of the original ZSM-5 zeolite, regardless of the type of cation. Referring to (b) of FIG. 2, a distinct peak corresponding to the (002) plane of the copper oxide appearing at 35.5° in Comparative Example 1 represented a copper oxide larger than 4 nm in size in the hydrocarbon adsorption and desorption complex of Comparative Example 1, but the peak did not appear in Example 1. This was consistent with what was observed in the transmission electron microscope images of FIG. 1. In addition, it was confirmed that large copper species (smaller particles formed in an aggregated form) were observed only in the hydrocarbon adsorption and desorption complex of Comparative Example 1 through the element mapping results shown in FIGS. 2 to 4.

Despite the XRD pattern of (a) of FIG. 2, a wide peak in the range of 15 to 30° and an additional peak of approximately 21.7° appeared in the XRD pattern of the hydrocarbon adsorption and desorption complex of Comparative Example 2, which appears to result from the formation of an amorphous phase and α-cristobalite. It can be seen through the newly appeared XRD peak that the structure of the hydrocarbon adsorption and desorption complex of Comparative Example 1 was more vulnerable to hydrothermal treatment than the hydrocarbon adsorption and desorption complex of Example 1. In addition, it was confirmed from the element mapping result of FIG. 4 that large copper oxide particles were observed only in the HC trap of Comparative Example 2 (indicated by a white arrow). In addition to the XRD analysis, referring to (e) to (f) of FIG. 2, nitrogen adsorption isotherm graphs can be confirmed for the hydrocarbon adsorption and desorption complexes of Examples and Comparative Examples, where the nitrogen adsorption isotherm and micropore size distribution after hydrogen cation exchange and copper impregnation fixation were similar. Table 2 shows that they had similar micropore volumes of approximately 0.12 to 0.13 cm$^3$/g. Referring to (e) to (f) of FIG. 2, the amounts of nitrogen adsorbed in both the hydrocarbon adsorption and desorption complexes of Example 2 and Comparative Example 2 decreased after hydrothermal treatment, but the degree of decrease was more pronounced in the hydrocarbon adsorption and desorption complex of Comparative Example 2. Specifically, referring to Table 2, it was confirmed that the micropore volume of Comparative Example 2 was 0.02 cm$^3$/g, which was only approximately 15% of the micropore volume of Comparative Example 1, whereas the micropore volume of Example 2 was 0.07 cm$^3$/g, which was approximately 60% of the micropore volume of Example 1. This indicates that the micropore structure of Comparative Example 1 was easily degraded and collapsed, as can be seen from the XRD analysis results.

In addition to obtaining the bulk structure and tissue properties by the XRD and nitrogen physisorption analysis, $^{29}$Si MAS NMR spectra were measured to evaluate the structure of the copper-impregnated zeolite after hydrothermal treatment, which is shown in (g) and (h) of FIG. 2. The hydrocarbon adsorption and desorption complexes of Example 1 and Comparative Example 1 exhibited similar $^{29}$Si MAS NMR spectra, which was mainly composed of $Q^4$ along with a portion of $Q^3$ and 3Si(1Al). In addition, it can be seen that the $^{29}$Si MAS NMR spectrum of Example 2 was similar to the $^{29}$Si MAS NMR spectrum of Example 1, and the zeolite structure was not changed after hydrothermal treatment. In contract, in the case of hydrothermal treatment of Comparative Example 2, the regions in the $^{29}$Si MAS NMR spectra corresponding to $Q^2$ as well as the region in the $^{29}$Si MAS NMR spectra corresponding to $Q^3$ and 3Si (1Al) were increased, indicating that the hydrocarbon adsorption and desorption complex of Comparative Example 1 was more vulnerable to hydrothermal treatment. This is also consistent with the above-mentioned XRD and nitrogen physisorption analysis results.

Considering that the structural and textural properties of the parent zeolite supports (NaZ and HZ) were well preserved after hydrothermal treatment, the structural collapse and damage of the hydrocarbon adsorption and desorption complexes of Examples 2 and Comparative Example 2 after hydrothermal treatment appear to be closely related to the impregnated copper species. In other words, the dislocation and migration of the impregnated copper species during hydrothermal treatment may facilitate the structural degradation of the zeolite support. Indeed, referring to FIGS. 5 and 6, it was confirmed that the copper oxide particles were responsible for the structural degradation of the zeolite support based on the XRD patterns and the nitrogen adsorption isotherms of CuO/NaZ and CuO/HZ. The structure of the zeolite collapsed since copper species were prone to forming copper aluminates with aluminum leached from the zeolite framework structure during hydrothermal treatment. In particular, since sodium cations induce a structural transition of the zeolite to α-cristobalite, they may facilitate the formation of copper aluminate, and thus facilitate structural damage and collapse. Therefore, the structural instability of the hydrocarbon adsorption and desorption complex of Comparative Example 2 appears to result from both copper oxide particles and sodium cations. Based on the above results, it was confirmed that the ZSM-5 zeolite containing hydrogen cations instead of sodium cations was suitable for impregnating copper cations inside the zeolite.

Through this, it can be seen that the hydrocarbon adsorption and desorption complex according to the present disclosure had copper oxides with a relatively small size formed on the copper ion-impregnated hydrogen cation-containing zeolite (ZSM-5) as compared to Comparative Example 1.

Experimental Example 2

In order to confirm the adsorbed amount of hydrocarbons and a treatment efficiency of the hydrocarbon adsorption and desorption complex according to the present disclosure, the cold start test (CST) was performed on Examples 1 and 2, Comparative Examples 1 and 2, the sodium cation-containing zeolite (NaZ), and the hydrogen cation-containing zeolite (HZ), and the results are shown in FIGS. 7 and 8.

In the cold start test, a simulated exhaust gas feed of 100 mL/min flowed to 0.06 g of zeolite particles that had been pre-treated at 600° C. for 30 minutes under the conditions of 30 mL/min He. At this time, the simulated exhaust gas feed composition was 100 ppm propene, 100 ppm toluene, 1 mol % oxygen ($O_2$), and 10 mol % water vapor ($H_2O$), balanced with helium (He), totaling 100 mL/min, where feed/weight=100,000 mL/g·h, and was exposed at 70° C. for five minutes, proceeded with a temperature increase condition of 53° C./min for 10 minutes, and then exposed at 600° C. for five minutes, and then the adsorption and desorption behavior of propene, toluene, and total hydrocarbons of hydrocarbons were confirmed through mass spectrometry and gas chromatography.

By understanding the structural and textural properties of the copper-impregnated ZSM-5 zeolite and the induced transition of hydrothermal treatment, the performance of the hydrocarbon adsorption and desorption complexes of Examples and Comparative Examples was evaluated by the cold start test (CST). Copper impregnation in the ZSM-5 zeolite improved the cool start test performance compared to the parent zeolite, which could not initially adsorb propene in the presence of water vapor. In addition, the cool start test performance under dry and wet feeding conditions is shown in FIG. 8. The effect of copper impregnation was prominent for the hydrogen cation-containing ZSM-5 zeolite (that is, CuHZ) as shown in (a1) to (c1) and (a2) to (c2) in FIG. 7. Specifically, for NaZ, the concentration of released propene equals the inlet concentration immediately, but for CuNaZ, the concentration of released propene equals the inlet concentration after approximately two minutes, and thus there is a slight delay effect. However, referring to (a1) to (b1) of FIG. 7, the time at which the desorbed toluene concentration reached the inlet concentration (at approximately 165° C. for seven minutes) was similar to both the hydrocarbon adsorption and desorption complex (CuNaZ) of Comparative Example 1 and NaZ, but the desorbed/released amount of Comparative Example 1 was small. On the other hand, the hydrocarbon adsorption and desorption complex (CuHZ) of Example 1 exhibited better performance. Referring to (a2) of FIG. 7, it was confirmed that the adsorbed propene molecules were gradually released as the temperature increased, but propene started to appear after approximately three minutes, and the concentration of propene equaled the inlet concentration at approximately five minutes. At the same time, referring to (b2) in FIG. 7, toluene was observed after approximately six minutes (approximately 150° C.), and the desorbed amount was significantly reduced, and appeared to be much lower than that observed in the hydrocarbon adsorption and desorption complex (CuNaZ) of Comparative Example 1 ((b1) in FIG. 7). Specifically, the adsorbed amount of propene by the hydrocarbon adsorption and desorption complex (CuHZ) of Example 1 was approximately 1.13 mg/g, which was approximately three times the adsorbed amount of propene by the hydrocarbon adsorption and desorption complex (CuNaZ) of Comparative Example 1 (approximately 0.39 mg/g). Considering the amount of propene adsorbed on NaZ and HZ (0.001 mg/g and 0.11 mg/g, respectively), copper impregnation forms the ZSM-5 zeolite exhibiting desirable propene adsorption ability in the presence of water vapor in the feed, especially when mixed into the hydrogen cation-containing zeolite. Through this, it can be seen that copper cations ($Cu+/Cu^{2+}$ ions) replace protons in the MFI type zeolite structure and contribute to enhancing propene adsorption. Referring to (b3) of FIG. 7, despite the increase in the adsorbed amount of propene by copper impregnation, the adsorbed amount of toluene was approximately 4.37 mg/g for NaZ, approximately 3.95 mg/g for Comparative Example 1 (CuNaZ), approximately 4.34 mg/g for HZ, and approximately 4.10 mg/g for Example 1 (CuHZ). However, the amount of toluene released from the HC trap of Example 1 was much smaller, followed by the HC trap of Comparative Example 1. In the HC traps of Example 1 and Comparative Example 1, no hydrocarbons (propene, toluene, and total hydrocarbons) were observed after approximately 10 minutes (corresponding to approximately 360° C.). In addition, referring to (a1) to (b3) and (c3) to (d3) of FIGS. 9A and 9B, in contrast to NaZ and HZ, which did not exhibit oxidizing ability, the HC traps of Example 1 and Comparative Example 1 simultaneously released CO and $CO_2$. Through this, it can be seen that the emission of hydrocarbons accompanying the generation of CO and $CO_2$ showed that the corresponding oxidation was caused by the small copper oxide on the outer surface of the zeolite.

In addition, the cool start test (CST) performance of hydrothermal-treated HC traps was investigated to confirm changes in adsorption and oxidation ability in particular. As confirmed in FIG. 4, it was confirmed from the CST results that the HC trap (CuNaZ) of Comparative Example 1 was more vulnerable to hydrothermal treatment. Specifically, referring to (a1) and (b1) of FIG. 7, it was confirmed that the hydrocarbon adsorption and desorption complex of Comparative Example 2 could not adsorb propene and toluene for one minute and five minutes or more, respectively, at an initial temperature of 70° C. in the CST test. On the other hand, referring to (a2) and (b2) of FIG. 7, the hydrocarbon adsorption and desorption complex of Example 2 exhibited better cool start performance, and specifically propene and toluene were maintained at 70° C. for up to three minutes and at 120° C. for up to six minutes, respectively. The adsorbed amounts of propene in the hydrocarbon adsorption and desorption complexes of Example 2 and Comparative Example 2 were 0.14 and 0.56 mg/g, respectively. In addition to propene adsorption, referring to (b3) of FIG. 7, the cumulative adsorbed amounts of toluene in the hydrocarbon adsorption and desorption complexes of Example 2 and Comparative Example 2 were 3.87 mg/g and 1.50 mg/g, respectively, which corresponds to approximately 96% and approximately 40% of the hydrocarbon adsorption and desorption complexes of Example 1 and Comparative Example 1, respectively. In addition, the releases of propene and toluene reached their minimum values after 15 minutes, at 600°° C. for the hydrocarbon adsorption and desorption complex of Comparative Example 2 (30 ppm propene, 0 ppm toluene), and after 11 to 12 minutes, at 500° C. for the hydrocarbon adsorption and desorption complex of Example 2 (0 ppm propene and toluene). However, it can be seen that the hydrocarbon emission was still detected by GC at high temperature, and the oxidation ability of the hydrocarbon adsorption and desorption complexes of Example 2 and Comparative Example 2 was slightly reduced compared to that of the fresh hydrocarbon adsorption and desorption complexes (Example 1 and Comparative Example 1). Accordingly, some discrepancies between GC and MS were observed in the blue arrows in (c4) and (d4) of FIG. 10B. Indeed, through the CO and $CO_2$ molecules detected by MS shown in (c3) and (d3) of FIG. 10B, it can be seen that the hydrothermal-treated hydrocarbon adsorption and desorption complexes had a poor oxidation ability. Referring to (c2) and (d2) in FIG. 10B, the chemical speciation of MS clearly revealed that the above-mentioned side reaction occurred instead of the desired hydrocarbon oxidation.

In addition to the qualitative evaluation of the CST performance, the CST hydrocarbon treatment efficiencies of both the sodium cation-containing hydrocarbon adsorption and desorption complexes (Comparative Examples 1 and 2) and the hydrogen cation-containing hydrocarbon adsorption and desorption complexes (Examples 1 and 2) were further defined and quantified in relation to the total hydrocarbon concentration ((c3) of FIG. 7). Despite the apparent adsorption for toluene, the CST efficiencies of NaZ and HZ were close to zero. This may be attributed to the full release of already adsorbed toluene at a relatively low temperature (approximately 160° C.). Referring to (c3) of FIG. 7, the copper-impregnated hydrocarbon adsorption and desorption complexes (Example 1 and Comparative Example 1) improved the CST efficiencies to 68.4% and 28.5%, respectively. Referring to (c1) and (c2) of FIGS. 7 and (c3) and (c4) of FIG. 9B, the improved CST efficiencies of Comparative Examples 1 and Example 1 appear to originate from adsorption (increased propene adsorption ability and decreased degree of toluene desorption) and oxidation (low-temperature at approximately 240 to 250° C.). Nevertheless, the CST efficiencies of the hydrothermal-treated hydrocarbon adsorption and desorption complexes (Example 2 and Comparative Example 2) were dramatically reduced to 12.0% and 4.8%, respectively. As inferred from the results of FIG. 4, (c3) of FIG. 7 shows that the hydrocarbon adsorption ability of the HC trap of Example 2 (CuHZ_HT) could be maintained to some extent, unlike Comparative Example 2 (CuNaZ_HT) in which the original structure was damaged.

Experimental Example 3—Correlation Between CST Performance and Physicochemical Properties of Hydrocarbon Adsorption and Desorption Complexes It is difficult to understand the CST efficiency of the HC trap or zeolite shown in (c3) of FIG. 7 only by physical properties. For example, despite similar amounts of micropore volumes (0.12 to 0.13 cm³/g in Table 2) in the HC traps of Comparative Example 1 and Example 1, the CST efficiencies were inconsistent. In order to describe the improved CST performance, the chemical properties of the copper-impregnated ZSM-5 zeolite were further investigated to determine which copper species determined the CST efficiency. Despite the combined function of propene and toluene adsorption, the CST efficiency appears to be more sensitive to propene adsorption since toluene is adsorbed even in non-copper-impregnated NaZ and HZ. The speciation of copper cations in the copper-impregnated zeolites was analyzed by $H_2$-TPR (FIG. 12) and NO-adsorbed FT-IR (FIG. 13) analysis. Although frequently used for the identification of a number of copper species (e.g., $Cu^{2+}$/CuO/$Cu^+$), the unclear reduction temperature and time-varying IR intensities were not suitable for drawing meaningful and quantitative conclusions. Nevertheless, the hydrocarbon adsorption and desorption complex (CuNaZ) of Comparative Example 1 includes most CuO particles, whereas the hydrocarbon adsorption and desorption complex (CuHZ) of Example 1 includes copper cations as well as CuO particles, and referring to (a3) to (b3) of FIG. 13, the amounts of $Cu^+$ ions in the HC trap of Example 1 and Comparative Example 1 were significantly different.

TABLE 3

| Sample | Textural properties | | | | Acid titration | | |
|---|---|---|---|---|---|---|---|
| | $S_{BET}$ (m²·g⁻¹) | $S_{micro}{}^a$ (m²·g⁻¹) | $S_{meso+ext}{}^a$ (m²·g⁻¹) | $V_{1\,nm}{}^b$ (cm³g⁻¹) | $B^c$ (μmol·g⁻¹) | $L_{Al/Cu}{}^c$ | $L_{Na}{}^c$ |
| CuNaZ_600/24 | 330 | 225 | 105 | 0.11 | 100 | 170 | 230 |
| CuNaZ_700/24 | 201 | 142 | 59 | 0.07 | 30 | 120 | 120 |
| CuNaZ_800/3 | 104 | 53 | 51 | 0.03 | 20 | 70 | 80 |
| CuHZ_600/24 | 373 | 261 | 112 | 0.12 | 120 | 460 | 0 |
| CuHZ_700/24 | 353 | 248 | 105 | 0.12 | 80 | 290 | 0 |
| CuHZ_800/3 | 257 | 164 | 93 | 0.08 | 50 | 210 | 0 |

In FIG. 14, the CST efficiency of (c3) of FIG. 7 may be described through the different amounts of $Cu^+$ ions of the hydrocarbon adsorption and desorption complexes of Example 1 and Comparative Example 1. Since CO molecules may selectively titrate $Cu^+$ ions, the CO adsorbed FT-IR spectra were measured, and the results are shown in FIG. 11. Referring to the generated IR spectra, the peak areas at wavenumbers of 2157 cm⁻¹ and 2150 cm⁻¹ were attributed to CO molecules [Cu(CO)]⁺ adsorbed to $Cu^+$ ions. Referring to (a) to (b) of FIG. 11, the amount of $Cu^+$ ions in the hydrocarbon adsorption and desorption complex (CuHZ) of Example 1 was much higher than the amount of $Cu^+$ ions of Comparative Example 1. This means that $Cu^+$ ions were more effectively placed in the hydrogen cation-containing ZSM-5 zeolite, and it can be seen that it is also in agreement with the elemental analysis mentioned in Table 1. Referring to FIGS. 14 and 15 and Table 3, it can be confirmed that, in the hydrothermal-treated hydrocarbon adsorption and desorption complex (CuNaZ, CuHZ), the amount of $Cu^+$ ions monotonically decreased with the degree of hydrothermal treatment ((1) 600° C., 24 hours, (2) 700° C., 24 hours, (3) 800° C., three hours, and (4) 800° C., 12 hours) with structural collapse/damage. Referring to (c) of FIG. 11, the results of CO-based FT-IR analysis may describe the CST efficiency of non-hydrothermal and hydrothermal samples when correction is performed by micropore volume ([Cu(CO)]⁺×$V_{1\,nm}$). Of course, the CST performance of the hydrothermal-treated hydrocarbon adsorption and desorption complexes under different conditions monotonically decreased according to the degree of hydrothermal treatment. (c) of FIG. 11 clearly shows that the CST efficiency of the copper-impregnated ZSM-5 zeolite is proportional to the $Cu^+$ ions inside the zeolite regardless of the cation effect. From this, it can be seen that the formation of $Cu^+$ ions in the hydrogen cation-containing zeolite is important for effective hydrocarbon adsorption.

In order to understand the physicochemical properties of the copper-impregnated zeolite, pyridine adsorption FT-IR analysis was performed to titrate the acid sites of the zeolite. For stringent measurements, FT-IR spectra of pyridine adsorbed samples were obtained after reaching their asymptotic behavior, and the results are shown in FIG. 15. The sodium cations of NaZ were not effectively replaced with the Cu cations for the hydrocarbon adsorption and desorption complex (CuNaZ) of Comparative Example 1; this trend was in good agreement with a similar Na/Al molar ratio of 0.9 in Table 1. On the other hand, considering that the reduced amount of the B site for the hydrocarbon adsorption and desorption complex (CuHZ) of Example 1 (130 µmol/g lower than HZ) is equal to or greater than twice the amount for the hydrocarbon adsorption and desorption complex (CuNaZ) of Comparative Example 1 (60 µmol/g lower than NaZ), a higher amount of Cu cations were introduced into the zeolite framework structure for CuHZ than for CuNaZ. At the same time, it was demonstrated that the higher intensity $L_{Al/Cu}$ sites (780) in CuHZ had significantly high amounts of copper cations compared to $L_{Al/Cu}$ sites (280) in CuNaZ. On the other hand, the hydrocarbon adsorption and desorption complexes of Example 2 and Comparative Example 2 after hydrothermal treatment lost a significant amount of acid sites. However, the amount of $L_{Al/Cu}$ sites in Example 2 was still approximately four times greater than the amount of $L_{Al/Cu}$ sites in Comparative Example 2. Different amounts of reduced acid sites in the hydrocarbon adsorption and desorption complexes of Example 2 and Comparative Example 2 means that the structure of the hydrogen cation-containing ZSM-5 zeolite is advantageous as a support. Accordingly, the structure of the zeolite in the hydrocarbon adsorption and desorption complex of CuNaZ appears to be more vulnerable to hydrothermal treatment than CuHZ. In addition, the appropriate physicochemical properties of the hydrothermally-treated hydrocarbon adsorption and desorption complex and the fresh hydrocarbon adsorption and desorption complex described the CST efficiency well together with the relationship derived from the CO-based titration adsorption ((c) of FIG. 11).

Experimental Example 4—Oxidation Ability of Copper Particles

The role of hydrocarbon adsorption in the related art is to adsorb hydrocarbons and release them at higher temperatures. Considering that, in most cases, hydrocarbon adsorption is likely to release adsorbed hydrocarbons before the temperature reaches the TWC operating range, the case where the cold adsorption ability is combined with the hydrocarbon adsorption ability is desirable for removing active hydrocarbons during the cold start period. In order to evaluate the oxidation activity of hydrocarbon adsorption, carbon monoxide (CO) and carbon dioxide ($CO_2$) molecules were investigated during cold start test (CST) measurements, and the results are shown in FIGS. 16 and 17.

Referring to FIG. 16, the oxidation of hydrocarbons by CuHZ was started at 210° C., which was much lower than the oxidation temperature of $CuO/SiO_2$ at 353° C. Referring to (c) of FIG. 16, it can be seen that the oxidation of pure CuO particles started at 303° C. From this, it can be seen that the CuO particles present on CuHZ had excellent hydrocarbon oxidation activity. In the oxidation activity of CuHZ at 300° C. in FIG. 18, active CuO particles were formed on the outer surface of the zeolite through wet impregnation, where the resulting copper-impregnated ZSM-5 zeolite was complementary or at least supplementary to the hydrocarbon oxidizing ability of the TWC.

(d) of FIG. 16 demonstrates that a high adsorption amount for the copper-impregnated ZSM-5 zeolite, especially for hydrogen cation-containing ZSM-5 zeolite, was advantageous for achieving low-temperature oxidation. Indeed, oxidation onset temperatures for hydrocarbon oxidation were much lower for CuHZ and CuNaZ than those observed for $CuO/SiO_2$ and CuO samples. From this, it can be seen that effective copper impregnation on the zeolite support was advantageous for securing both significant hydrocarbon adsorption and oxidation functions. Referring to FIG. 17, when the hydrocarbon adsorption and desorption complex (CuHZ) of Example 1 was compared with the hydrocarbon adsorption and desorption complex (CuNaZ) of Comparative Example 1, both $CuO/SiO_2$ and CuO exhibited oxidation ability at a much higher temperature (approximately 300° C. or higher), but hydrocarbon was not adsorbed. In addition, referring to (d) of FIG. 16, it was found that the trend between the adsorption and oxidation abilities of CuNaZ and hydrothermally-treated CuNaZ was different from that between the adsorption and oxidation abilities of CuHZ and hydrothermally-treated CuHZ, indicating that there was an importance factor in determining the overall CST performance. For oxidation, smaller CuO particles on CuHZ (3.2 nm, 6.8 nm for CuNaZ) were advantageous to achieve low temperature oxidation. In summary, significant hydrocarbon adsorption and oxidation abilities were both obtained through copper impregnation into the hydrogen cation-containing ZSM-5 zeolite.

The invention claimed is:
1. A hydrocarbon adsorption and desorption complex comprising:
zeolite particles containing hydrogen cations;
copper ions chemically bounded to the zeolite particles; and
metal oxides provided on surfaces of the zeolite particles,
wherein the zeolite particle is a zeolite socony Mobil-5 (ZSM-5)-based particle,
wherein a molar ratio of sodium to aluminum (Na/Al) in the zeolite particles is 0.2 or less,
wherein an average diameter of the metal oxides is 1 to 10 nm,
wherein the hydrocarbon adsorption and desorption complex has a micropore having a size of 1 nm or less with a volume of 0.060 to 0.072 $cm^3/g$,
wherein a Si/Al molar ratio of the hydrocarbon adsorption and desorption complex is 11.3±1.3 to 12.7±2.1,
wherein the hydrocarbon adsorption and desorption complex is subjected to hydrothermal treatment using 5 to 15 mol % of water vapor at 600° C. to 900° C. for one hour to 36 hours,
wherein an adsorption and desorption performance of the hydrocarbon adsorption and desorption complex satisfies the following Formula 1:

$$\left[1 - \frac{Q_{out}}{Q_{In}}\right] \times 100 > A \quad (1)$$

where $Q_{In}$ represents the amount of hydrocarbons injected into the hydrocarbon adsorption and desorption complex,
$Q_{Out}$ represents the amount of hydrocarbons released through the hydrocarbon adsorption and desorption complex, A is a number of 5 or more, and represents a hydrocarbon treatment efficiency, and wherein an average diameter of a particle size of the hydrocarbon adsorption and desorption complex is 300 to 1500 nm.

2. The hydrocarbon adsorption and desorption complex of claim 1, wherein the hydrocarbon adsorption and desorption complex exhibits adsorption of hydrocarbons at a temperature of 300° C. or lower, and exhibits oxidation at a temperature of 180° C. or higher.

3. The hydrocarbon adsorption and desorption complex of claim 1, wherein the metal oxides are oxides of any one or more metals of elements of Groups 3 to 12.

4. The hydrocarbon adsorption and desorption complex of claim 3, wherein the metal oxides are oxides of any one or more metals of iron, cobalt, nickel, copper, zinc, rhodium, and cadmium.

5. The hydrocarbon adsorption and desorption complex of claim 1, wherein the copper ions are bounded inside pores formed in the zeolite particles.

6. A preparation method for the hydrocarbon adsorption and desorption complex of claim 1, comprising:

preparing the zeolite particles containing hydrogen cations by using an ion exchange method; and forming the copper ions and the metal oxides by mixing the zeolite containing the hydrogen cations with a solution containing the copper ions, wherein in the preparing of the zeolite particles containing hydrogen cations, the molar ratio of sodium to aluminum (Na/Al) of the zeolite particles is 0.2 or less, and the metal oxides are formed such that the average diameter of the metal oxides on the zeolite particles is 1 to 10 nm.

7. The preparation method for a hydrocarbon adsorption and desorption complex of claim 6, wherein the zeolite particle is a zeolite 3ocony Mobil-5 (ZSM-5)-based particle.

8. The preparation method for a hydrocarbon adsorption and desorption complex of claim 6, wherein in the preparing of the zeolite particles containing the hydrogen cations, an ammonium salt aqueous solution is mixed with the zeolite particles for 20 hours to 30 hours, and the ammonium salt aqueous solution contains any one or more of ammonium sulfate, ammonium nitrate, ammonium chloride, ammonium acetate, ammonium persulfate, aqueous ammonia, ammonium bicarbonate, and ammonium formate.

9. The preparation method for a hydrocarbon adsorption and desorption complex of claim 6, wherein a wet impregnation method is used in the forming of the metal copper ions and the metal oxides.

10. The preparation method for a hydrocarbon adsorption and desorption complex of claim 6, further comprising after the forming of the copper ions and the metal oxides, performing hydrothermal treatment by injecting 5 to 15 mol % of water vapor at a temperature of 600° C. to 900° C. for one hour to 36 hours, wherein an hourly gas flow rate of a simulated exhaust gas including water vapor to the weight of the hydrocarbon adsorption and desorption complex is 10,000 to 200,000 mL/g·h.

11. A hydrocarbon adsorption and desorption complex for vehicles comprising the hydrocarbon adsorption and desorption complex according to claim 1.

* * * * *